United States Patent [19]

Kobayashi

[11] Patent Number: 5,111,230
[45] Date of Patent: May 5, 1992

[54] LENS SHUTTER DRIVING MECHANISM USING LENS DRIVING MECHANISM

[75] Inventor: Kouichi Kobayashi, Tokyo, Japan

[73] Assignee: COPAL Company Limited, Tokyo, Japan

[21] Appl. No.: 574,284

[22] Filed: Aug. 28, 1990

[30] Foreign Application Priority Data

Aug. 29, 1989 [JP] Japan .................................. 1-222527
Sep. 29, 1989 [JP] Japan .................................. 1-254427
Nov. 30, 1989 [JP] Japan .......................... 1-139063[U]

[51] Int. Cl.⁵ ......................... G03B 9/08; G03B 13/36
[52] U.S. Cl. ................................ 354/400; 354/234.1; 354/439
[58] Field of Search ............ 354/400, 435, 439, 234.1, 354/195.11

[56] References Cited

U.S. PATENT DOCUMENTS 4,985,724 1/1991 Akimoto et al. ..................... 354/400

Primary Examiner—W. B. Perkey
Attorney, Agent, or Firm—Wenderoth, Lind & Ponack

[57] ABSTRACT

A main driving member coupled with a stepping motor is advanced or returned by normal and reverse rotation of the stepping motor. When the main driving member is advanced, a lens driving member follows the main driving member to be advanced to a focused position and is engaged at the focused position. A shutter mechanism is opened and closed in the course of the returning of the main driving member and subsequently the engagement of the lens driving member is released in the course of the returning of the main driving member so that the lens driving member is returned to its initial position. Any one of a sensor for detecting the initial position of the main driving member or a sensor for detecting the initial position of the lens driving member is provided. By employing one of the two sensors, a single sensor is used to confirm the operation of both of the lens driving member and the main driving member.

6 Claims, 17 Drawing Sheets

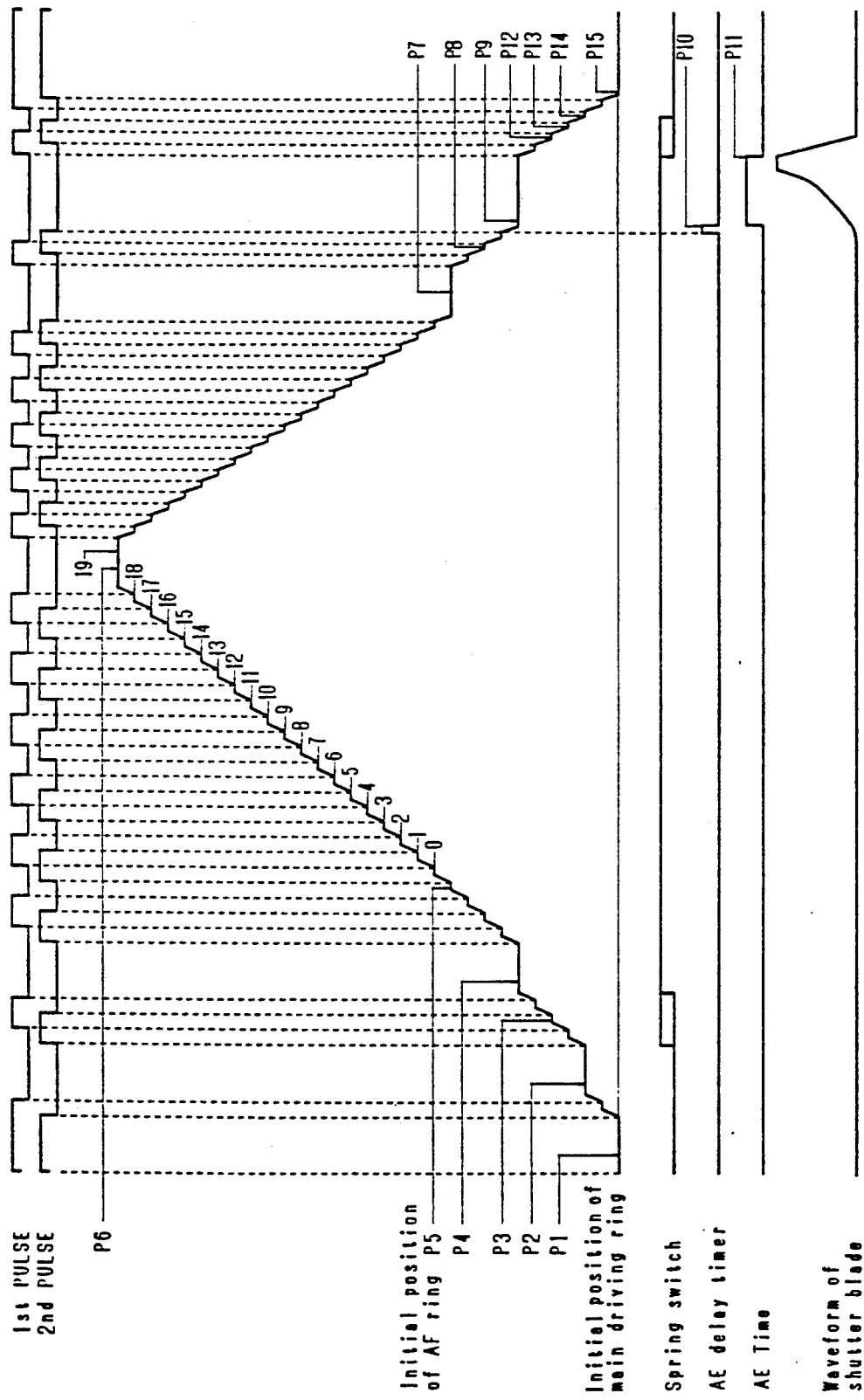

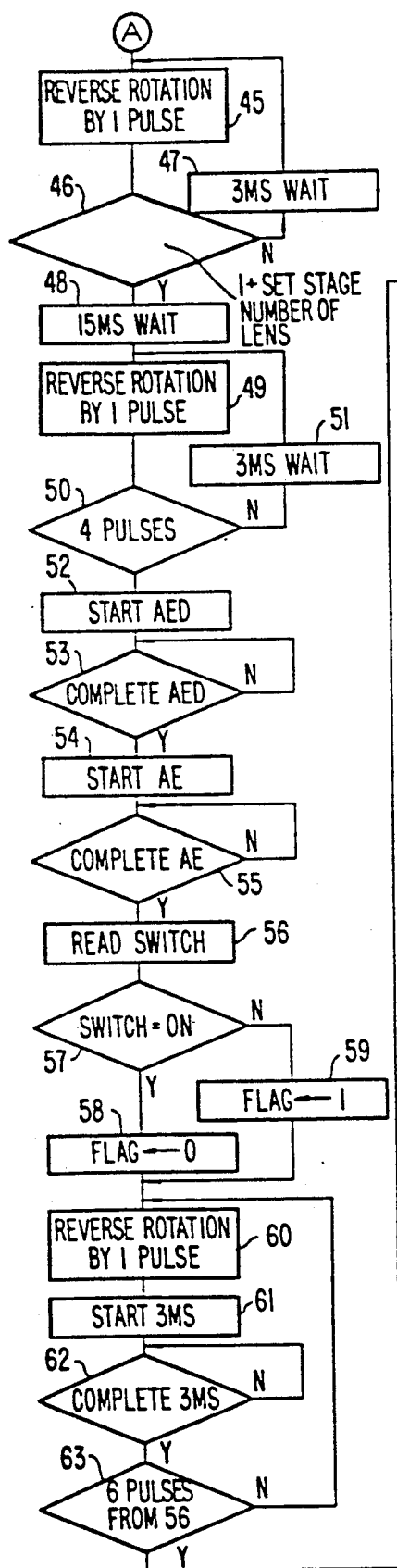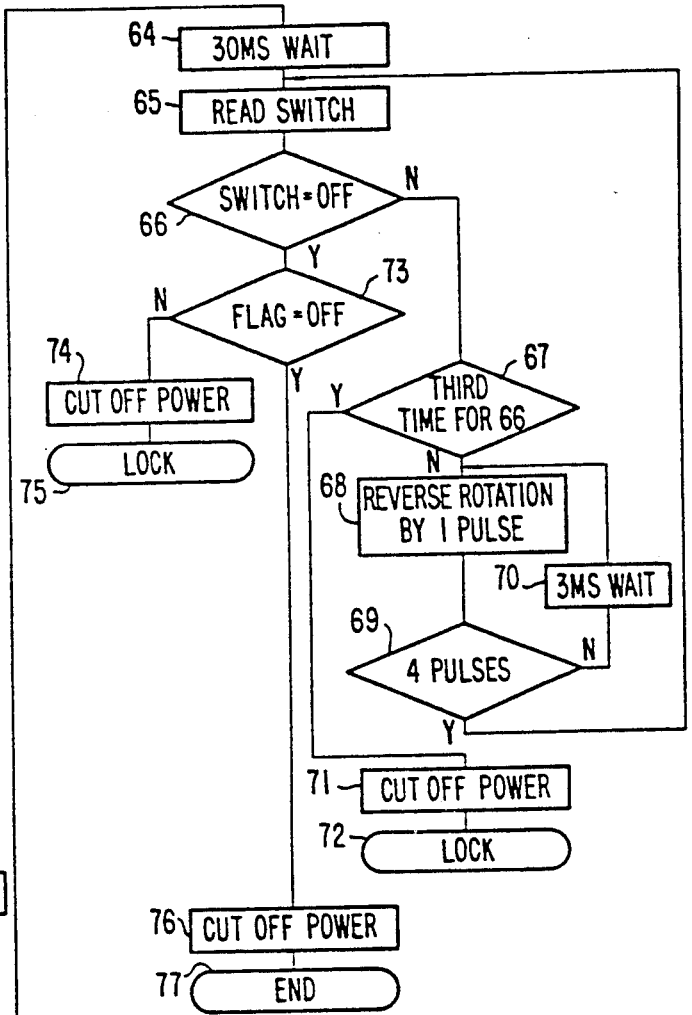
FIG. 7B

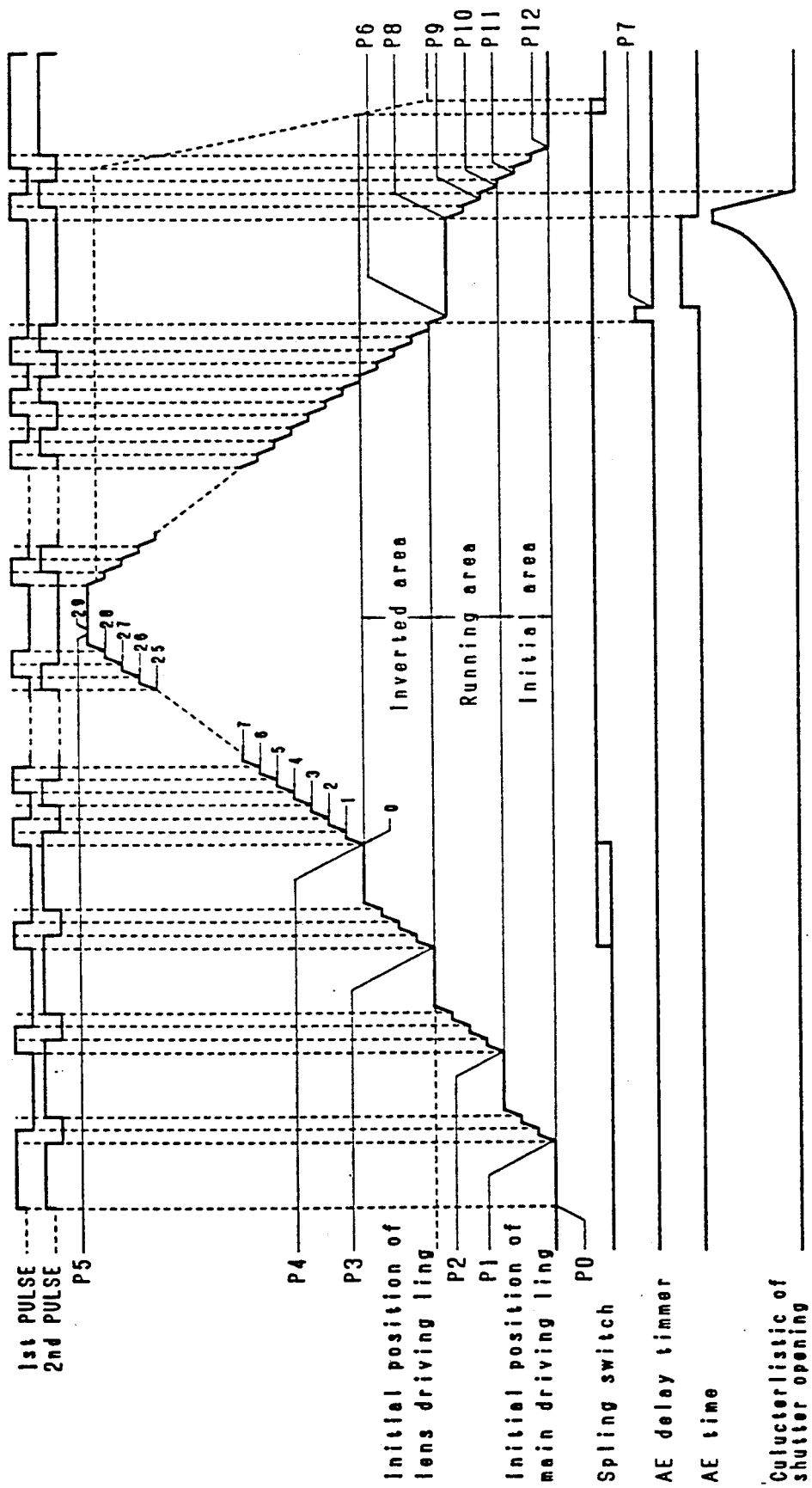

LENS SHUTTER DRIVING MECHANISM USING LENS DRIVING MECHANISM

BACKGROUND OF THE INVENTION

The present invention relates to a lens shutter driving mechanism using a lens driving mechanism.

Heretofore, a lens shutter driving mechanism is known using the lens driving mechanism in which both of a focus adjusting lens and a lens shutter are driven by a driving source constituted of a single stepping motor.

The focus adjusting operation in a single photographing operation is made prior to the shutter release operation. Accordingly, the driving mechanism of this type moves a lens driving member through a main driving member coupled through a gear with a stepping motor to a desired focused position upon the normal rotation of the stepping motor and engages the lens driving member at the focused position by means of the engagement mechanism such as, for example, a ratchet mechanism. Thereafter, the stepping motor is rotated reversely and the shutter mechanism is operated through the main driving member upon the reverse rotation of the stepping motor.

In the driving mechanism of this type, in order to control the reliable operation, it is necessary to confirm operations of the main driving member coupled through a gear with the stepping motor and the lens driving member coupled with a focus adjusting lens group.

In order to confirm the operations of both of the driving members, it is considered that positional sensors constituted of, for example, a limit switch or an photoelectric sensor are provided independently for both of the main driving member and the lens driving member.

However, there is a problem in that a cost of the sensors are high when the positional sensors are provided in both of the driving members.

In addition, since the main driving member and the lens driving member are disposed in a very small space, the provision of the two types of sensors is disadvantageous in terms of the space for the disposition.

Further, it is desired that a time lag until the completion of operation of the lens driving mechanism and the shutter driving mechanism of the automatic focusing type after the shutter button has been depressed by a photographer be as short as possible. Accordingly, when these mechanisms are operated using the stepping motor as a driving source, it is desired to shorten a period of a drive pulse for the stepping motor. However, when the period of the drive pulse for the stepping motor is shortened, the danger that the positional sensor will not effect exact detection due to chattering of the positional sensor and an attenuation characteristic in the step rotation of the stepping motor is increased. To this end, generally, an abnormal operation of the positional sensor is prevented by relative extension of the period of the drive pulse in an area in which the on and off state of the positional sensor is reversed.

In this connection, in order to ensure sufficient accuracy as the positional sensor for the driving members such as the lens driving mechanism and the shutter driving mechanism of the camera mounted in a very small space, the area in which the on and off state of the positional sensor is reversed is desired to have several steps in terms of the number of rotational steps of the stepping motor. In this manner, to ensure the several steps as the area in which the on and off state of the positional sensor is reversed is desired in terms of ensuring room for correction of an error when the error occurs at the initial position of the driving member.

Thus, when the period of the drive pulse is extended throughout the area in which the on and off state of the positional sensor is reversed as described above, a time lag until the shutter is actually operated after the shutter button has been depressed is lengthened.

It is a matter of course that if the number of steps in the area in which the on and off state of the positional sensor is reversed is reduced, the time lag can be shortened. In this case, since the state of the positional sensor is reversed while the driving member is moved in a vary small range, it is necessary to use an expensive sensor capable of detecting very small movement and room for correction of an error can be ensured wh*en the error occurs at the initial position.

BRIEF SUMMARY OF THE INVENTION

In view of the above problems, it is a first object of the present invention to provide a lens shutter driving mechanism using a lens driving mechanism adapted to confirm operations of a main driving member directly coupled through a gear with a stepping motor and a lens driving member coupled with a focus adjusting lens group using a single positional sensor.

Further, it is a second object of the present invention to shorten a time lag until a shutter is actually operated after a shutter button has been depressed while maintaining an area in which the on and off state of the positional sensor is inverted sufficiently on the assumption of the above driving mechanism.

According to a first preferred aspect of the present invention, the lens shutter driving mechanism using lens driving mechanism of the present invention comprises:

a stepping motor capable of rotating in the normal and reverse directions in accordance with a phase order of a sequentially supplied pulse train;

a main driving member coupled with the stepping motor to be driven in a forward direction and a return direction in accordance with the rotational direction of the stepping motor;

a blade driving member coupled with a shutter blade and disposed adjacent a moving line of the main driving member to open and close the shutter blade;

a blade driving member starting member formed in the main driving member so as to not operate the blade driving member in the forward movement of the main driving member from its initial position and to operate the blade driving member in the return movement of the main driving member to its initial position;

a lens driving member urged to move in the return direction of the main driving member and advanced to follow the main driving member after the blade driving member starting member formed in the main driving member has passed by the blade driving member in the forward movement of the main driving member to drive a focus adjusting lens group;

an engagement member for engaging the lens driving member so as to not prevent the forward movement of the lens driving member and to restrict the return movement of the lens driving member;

an engagement release portion formed in the main driving member to release the engagement of the lens driving member by the engagement member after the blade driving member starting member has operated the blade driving member in the return movement of the main driving member;

a positional sensor for producing a signal identifying a first state in which the main driving member is in its initial position and a second state in which the main driving member is in a position advanced from the initial position; and control means for controlling a normal pulse and a reverse pulse supplied to the stepping motor to control the normal rotation and the reverse rotation of the stepping motor and for confirming the initial position of the main driving member in accordance with an output of the positional sensor.

The control means controls an amount of normal rotation of the stepping motor counted from the timing that a logic of the positional sensor is inverted from the first state to the second state when the stepping motor is rotated in the normal direction and reads a state of the positional sensor at a timing that reverse rotation pulses having the number necessary to return the main driving member to a position just before the logic of the positional sensor is inverted from the second state to the first state are supplied to the stepping motor in the reverse rotation of the stepping motor so that the control means determines an occurrence of an abnormal operation when the positional sensor is in the first state in the reading.

In the first aspect described above, the main driving member is advanced in response to the normal rotation of the stepping motor and the lens driving member is advanced to follow the main driving member.

When the lens driving member reaches the focused portion, the stepping motor reverses the main driving member. The blade driving member is operated in this return course of the main driving member to open and close the shutter blade.

In the aspect, the first positional sensor directly detects the initial position of the main driving member. However, it is possible to confirm the operation of the lens driving member with the above structure.

In the first aspect, the control means reads the output of the positional sensor at the timing in which reverse rotation pulses having the number necessary to return the main driving member to a position just before the positional sensor is inverted from the second state to the first state are supplied to the stepping motor in the reverse rotation of the stepping motor.

When the lens driving member can advance to the desired focused position in the forward movement, the output of the positional sensor should represent the second state in the above reading timing.

However, when the lens driving member can not advance to the desired focused position due to, for example, positional failure of a lens barrier or accumulated dust around a lens barrel, the lens driving member and the main driving member start the return movement from the trouble location positioned before the desired focused position. Accordingly, the output of the positional sensor is already inverted to the first state at the reading timing.

Thus, the control means can determine failure in feeding of the lens driving member when the output of the first positional sensor is already inverted to the first state at the reading timing. In other words, the positional sensor for detecting the initial position of the main driving member can be used to confirm the operation of the lens driving member.

According to a second preferred aspect of the present invention, the lens shutter driving mechanism using the lens driving mechanism of the present invention comprises:

A stepping motor capable of rotating in normal and reverse directions in accordance with a phase order of a sequentially supplied pulse train;

a main driving member coupled with the stepping motor to be driven in a forward direction and a return direction in accordance with the rotational direction of the stepping motor;

a blade driving member coupled with a shutter blade and disposed adjacent a moving line of the main driving member to open and close the shutter blade;

a blade driving member starting member formed in the main driving member so as to not operate the blade driving member in the forward movement of the main driving member from its initial position and to operate the blade driving member in the return movement of the main driving member to its initial position;

a lens driving member urged to move in the return direction of the main driving member and advanced to follow the main driving member after the blade driving member starting member formed in the main driving member has passed by the blade driving member in the forward movement of the main driving member to drive a focus adjusting lens group;

an engagement member for engaging the lens driving member so as to not prevent the forward movement of the lens driving member and to restrict the return movement of the lens driving member;

an engagement release portion formed in the main driving member to release the engagement of the lens driving member by the engagement member after the blade driving member starting member has operated the blade driving member in the return movement of the main driving member;

a positional sensor for identifying a first state in which the lens driving member is in its initial position and a second state in which the lens driving member is a position advanced from the initial position; and control means for controlling a normal pulse and a reverse pulse supplied to the stepping motor to control the normal rotation and the reverse rotation of the stepping motor and for confirming the initial position of the lens driving member in accordance with an output of the positional sensor.

The engagement release portion is formed in a position in which the engagement of the lens driving member by the engagement is released after the blade driving member starting member has operated the blade driving member in the return movement of the main driving member and after the main driving member has returned from its initial position to within at least one round in terms of a pulse train of reverse pulses supplied to the stepping motor.

Accordingly, the positional sensor is to detect the initial position of the lens driving member directly, while when the positional sensor indicates that the lens driving member is returned to the initial position, it can be determined that the main driving member has been returned from its initial position to within at least one round in terms of the pulse train of reverse pulses supplied to the stepping motor.

Further, an offset amount with which the lens driving member follows the main driving member after advancement by at least two rounds in terms of a pulse train in the normal rotational direction supplied to the stepping motor by the main driving member from the initial position thereof is set between the initial position of the main driving member and the initial position of the lens driving member. The control means is adapted to control an amount of normal rotation of the stepping motor counted from the timing that the positional sensor is inverted from the first state to the second state in the normal state of the stepping motor.

Accordingly, as far as the main driving member is returned from its initial position to within at least one round in terms of a pulse train of reverse pulses supplied to the stepping motor in the return movement to the initial position, it is possible to move a lens driving ring to a desired position.

BRIEF DESCRIPTION OF THE DRAWINGS

FIG. 6 is a timing chart of the mechanism shown in FIG. 1;

FIGS. 7A and 7B are a flow chart showing control of the mechanism shown in FIG. 1;

FIG. 13 is a timing chart of the mechanism shown in FIG. 11;

DETAILED DESCRIPTION OF THE PREFERRED EMBODIMENTS

An embodiment of the present invention is now described in detail with reference to the drawings.

Figure 1:
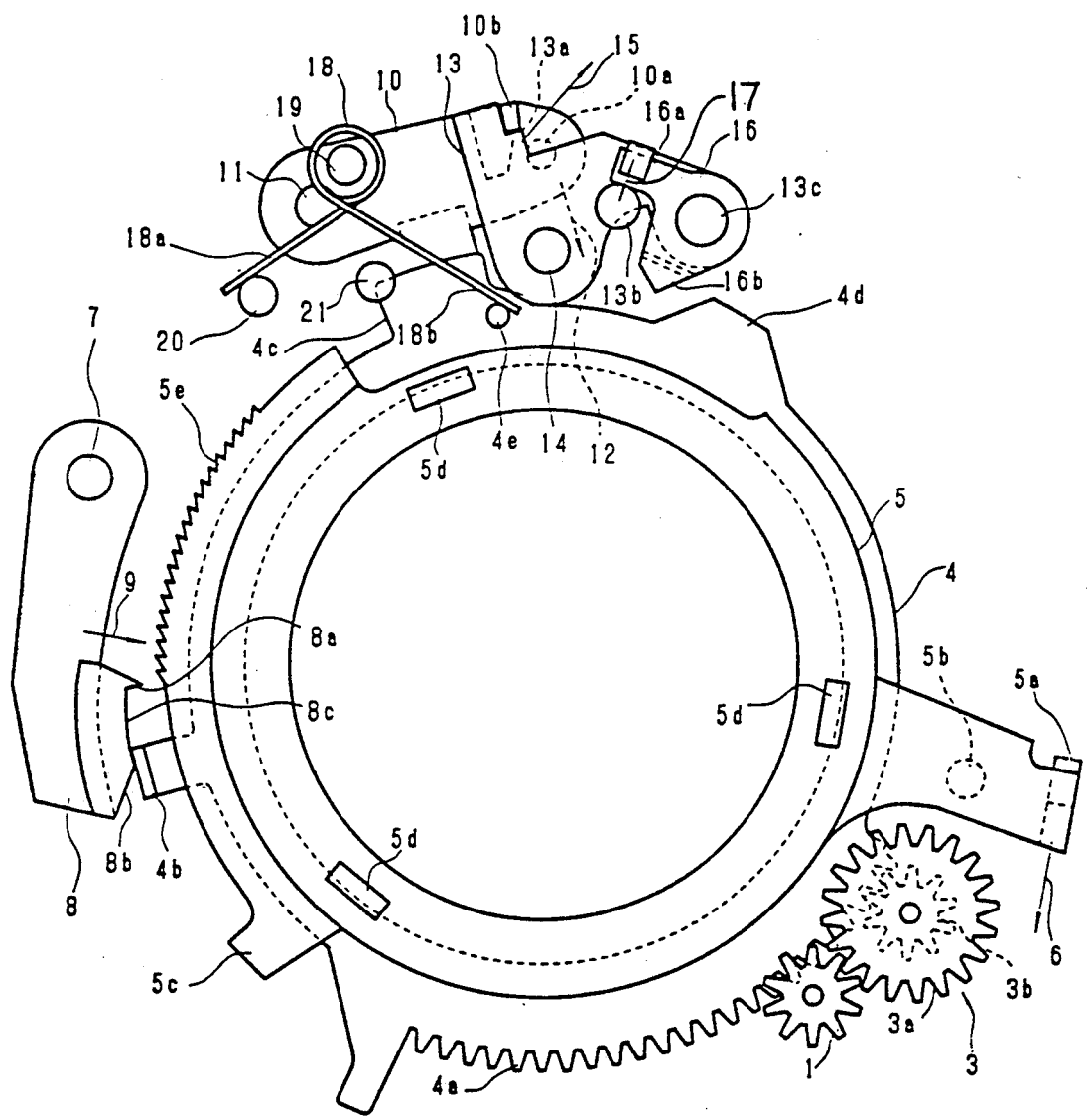
FIG. 1 is a plan view showing an initial state of a lens shutter driving mechanism using a lens driving mechanism according to an embodiment of the present invention.
Figure 2:
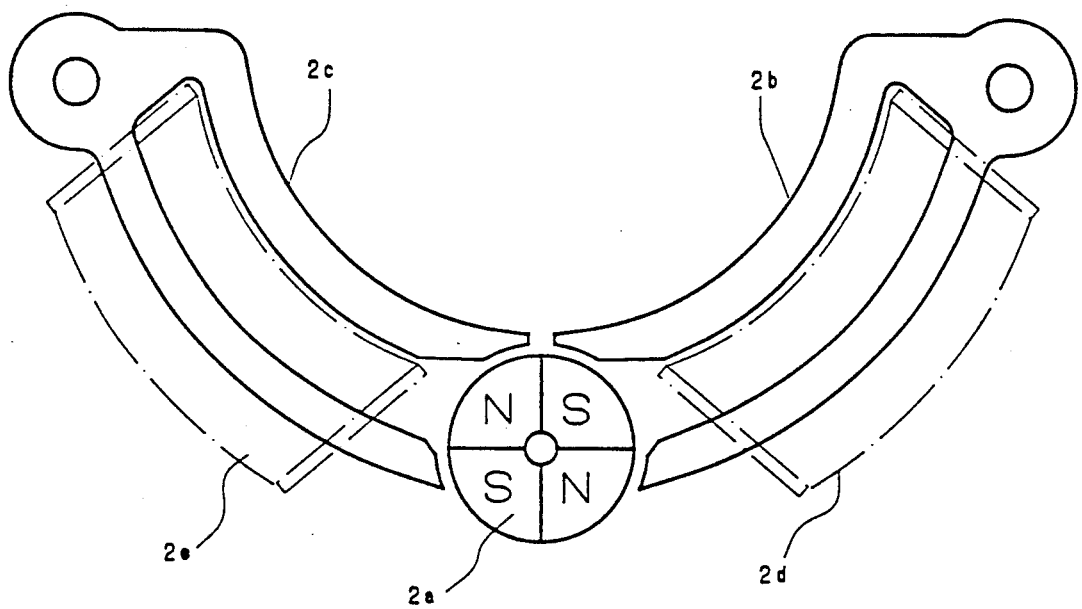
FIG. 2 is a diagram showing a structure of a stepping motor used in the mechanism of FIG. 1.

FIG. 1 is a plan view showing an initial state of a lens shutter driving mechanism using a lens driving mechanism according to an embodiment of the present invention, and FIG. 2 is a diagram showing a structure of a stepping motor for driving a pinion 1 shown in FIG. 1.

As shown in FIG. 2, the stepping motor 2 includes a four-pole rotor 2a having S poles and N poles disposed alternately at 90 degree intervals and curved U-shaped stators 2b and 2c disposed on the both sides of the rotor 2a. Each of the stators 2b and 2c includes magnetic poles disposed at 90 degree intervals in terms of the rotational angle of the rotor 2a. One magnetic pole of the stators 2b and 2c is fixed to maintain a 45 degree interval and the other magnetic pole is fixed to maintain a 135 degree interval.

Coils 2d and 2e are wound on the stators 2b and 2c, respectively. When pulses applied to the coil 2d are defined as first pulses and pulses applied to the coil 2e are defined as second pulses, a pulse train (normal rotation pulse) forming one round by [H,H]-[H,L]-[L,L]-[L,H] is sequentially supplied to the coils 2d and 2e so that the rotor 2a is rotated in the normal direction (counter-clockwise), whereas a pulse train (reverse rotation pulse) forming one round by [L,H]-[L,L]-[H,L]-[H,H] which is different in the phase order from that of the normal rotation pulse train is sequentially supplied to the coils so that the rotor 2a is rotated in the reverse direction (clockwise).

A rotating shaft of the rotor 2a is coupled with the pinion 1 shown in FIG. 1, and the pinion 1 is meshed with a large-diameter wheel 3a of a two-stage gear 3 composed of the large-diameter wheel 3a and a small-diameter wheel 3b.

A main driving ring 4 is supported rotatably around an exposure aperture. A rack 4a formed on a portion of an external periphery of the main driving ring 4 is engaged with the small-diameter wheel 3b of the two-stage gear 3. Accordingly, the rotation of the pinion 1 is transmitted through the two-stage gear 3 to the main driving ring 4 which is rotated in the same direction as the pinion 1.

A lens driving ring 5 is supported rotatably around the periphery of the exposure aperture in the same manner as the main driving ring 4.

A spring 6 (in the drawing, springs are represented only by arrow indicative of the forcing direction of the springs) is hung on a spring hanger 5a formed to be protruded on an external periphery of the lens driving ring 5 to return the lens driving ring 5 to its initial position. The lens driving ring 5 is urged to be rotated clockwise by the spring 6, while the clockwise rotation of the lens driving ring 5 is restricted in the state shown in FIG. 1 by abutment of a stopper pin 5b fixedly mounted on the rear surface of the spring hanger 5a against a stopper member (not shown) formed on a base plate for the shutter (not shown).

A bent portion 4b which causes the lens driving ring 5 to follow the main driving ring 4 is formed on the external periphery of the main driving ring 4 with the bent portion 4b being bent toward this side in FIG. 1. An engagement protrusion 5c protruded in the counter-clockwise path of the bent portion 4b is formed on the external periphery of the lens driving ring 5.

Figure 3:
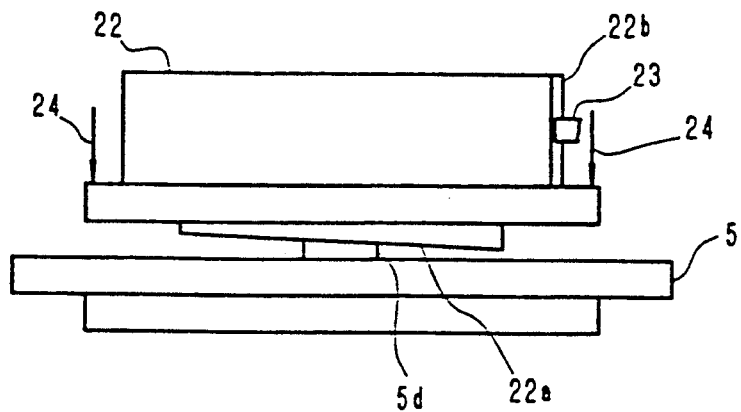
FIG. 3 is a diagram showing a relation of a lens driving ring and a focus adjusting lens group used in the mechanism shown in FIG. 1.

Three projections 5d are formed on this side (lens side) of the lens driving ring 5 at 120 degree intervals. FIG. 3 shows a relation of the projections 5d and a lens barrel 22 including a focus adjusting lens group in principle. Three cams 22a (only one projection 5d and one cam 22a are shown in FIG. 3) are formed on the film side of the lens barrel 22 at 120 degree intervals in the same manner. The rotation of the lens barrel 22 is prevented by, for example, a guide groove 22b and a guide piece 23 mounted on a camera body (not shown) and the lens barrel 22 is urged to be moved toward the lens driving ring 5 by a spring 24. When the lens driving ring 5 is rotated, the lens barrel 22 is extended toward an object to be photographed.

Further, in FIG. 1, a ratchet gear 5e is formed on the external periphery of the lens driving ring 5 to position the lens driving ring 5. A ratchet lever 8 for engaging the ratchet gear 5e is swingably supported to a shaft 7 fixed outside of the ratchet gear 5e. The ratchet lever includes a click 8a for engaging the ratchet gear 5e and is urged to be rotated counterclockwise about the shaft 7 by a spring 9, while a self portion 8c formed continuously to a cam surface 8b abuts against an external surface of the bent portion 4b to restrict the counter-clockwise rotation by the spring 9.

Figure 4:
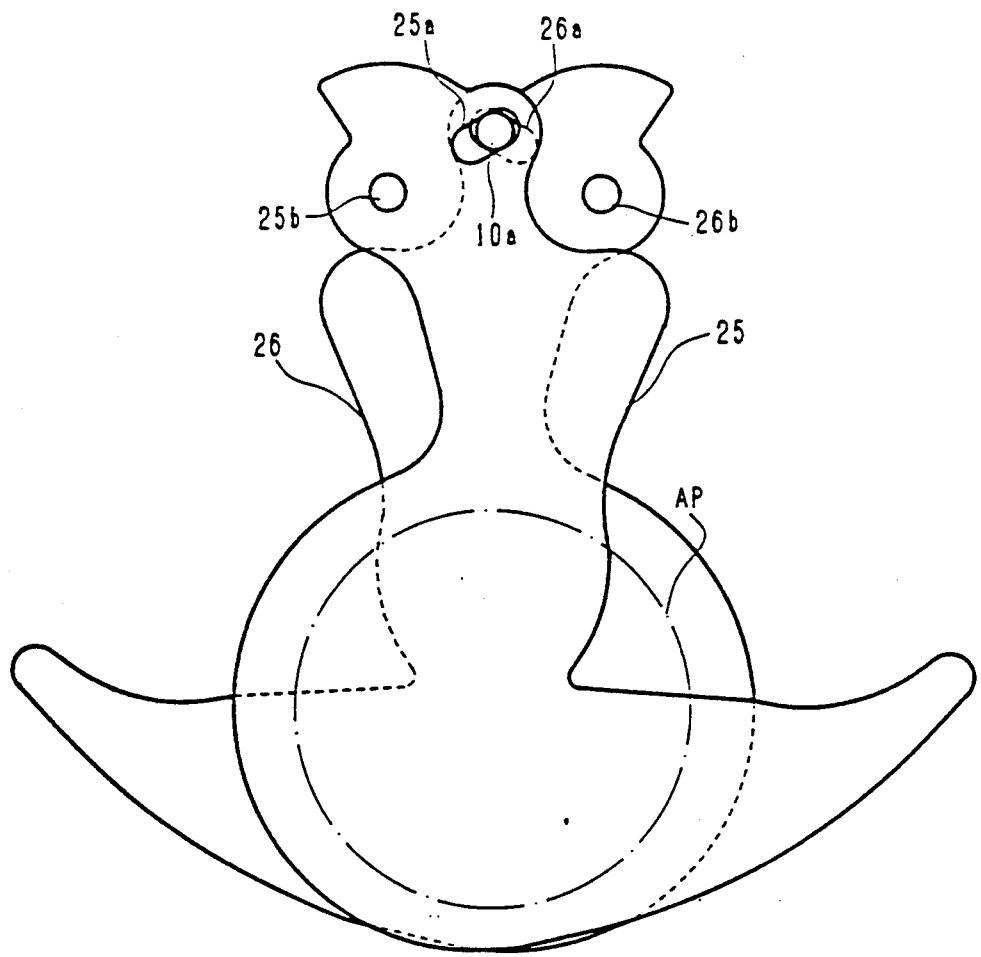
FIG. 4 is a plan view of a shutter blade having the function of a diaphragm blade.

An opening and closing lever 10 is to open and close a pair of shutter blades 25 and 26 shown in FIG. 4 and is swingably supported on a shaft 11 fixed on the base plate.

A blade driving pin 10 which is engaged into elongated grooves 25a and 26a formed in the pair of shutter blades 25 and 26 is mounted in the rear surface of the lever 10. When the lever 10 is rotated about the shaft 11 clockwise, the pair of shutter blades 25 and 26 are swung about corresponding shafts 25b and 26b, respectively, to open an aperture AP for exposure.

The driving force for rotating the lever 10 clockwise is given by a spring 12. However, in the initial state, a hold projection 4c formed on the external periphery of the main driving ring 4 abuts against the lever 10 to hold the lever 10 in the shutter closed position.

An engagement lever 13 serves to stop the opening and closing lever 10 at the closed position after the main driving ring 4 has been rotated counterclockwise. The engagement lever 13 is rotatably supported to a shaft 14 on the base plate and is urged to be rotated clockwise by a spring 15 having a force larger than that of the spring 12 for rotating the opening and closing lever 10 clockwise. A notch 13a formed in the engagement lever 13 is engaged with a square pin 10b formed to be protruded to this side of the opening and closing lever 10 so that the clockwise rotation of the opening and closing lever 10 is restricted by the clockwise rotation given from the spring 15 to the engagement lever 13.

A cam lever 16 for releasing the stop of the opening and closing lever 10 by the engagement lever 13 to operate the opening and closing lever 10 is rotatably supported to a shaft 13c on the engagement lever 13.

A spring 17 is attached between an operating arm 16a of the cam lever 16 and a pin 13b formed in the engagement lever 13. The cam lever 16 restricts the relative rotation to the engagement lever 13 in a state in which the operation arm 16a abuts against the pin 13b. The cam lever 16 can be rotated clockwise when the cam lever 16 receives clockwise rotation force larger than the tension of the spring 17.

A mountain type trigger arm 16b is formed on the other end of the cam lever 16. The trigger arm 16b extends in a movement path of a trapezoidal cam 4d formed on the external periphery of the main driving ring 4.

Accordingly, when a left inclined surface of the trapezoidal cam 4d abuts against the trigger arm 16b in the counterclockwise rotation of the main driving ring 4, the cam lever 16 is rotated clockwise against the tension of the spring 17. Further, when a right inclined surface of the trapezoidal cam 4d abuts against the trigger arm 16b in the clockwise rotation of the main driving ring 4, the cam lever 16 is rotated counterclockwise together with the engagement lever 13.

Then, a conductive spring switch 18 which is a feature of the present embodiment is wound around a pin 19 fixedly mounted to a member (not shown).

Conductive elements 20 and 21 are also fixedly mounted to a member (not shown). A stationary terminal 18a of the spring switch 18 is engaged with the conductive element 20. When a free end 18b of the spring switch 18 comes into contact with the conductive element 21, the conductive element 20 is electrically connected through the spring switch 18 to the conductive element 21. The free end 18b of the spring switch is engaged with an insulative projection 4e fixedly mounted to the surface of the main driving ring 4 in the initial state so that the conductive element 20 is electrically disconnected from the conductive element 21. However, when the free end 18b is brought into contact with the conductive element 21 by the resilience of the spring switch 18 in accordance with the counterclockwise rotation of the main driving ring 4, the conductive element 20 is electrically connected to the conductive element 21 through the spring switch 18.

In other words, the spring switch 18 serves as a positional sensor for detecting the initial position of the main driving ring 4.

As a feature of the present embodiment, the relative position of the insulative projection 4e and the conductive element 21 is such that the free end 18b abuts against the conductive element 21 while the main driving ring 5 is moved during four pulses from a position rotated counterclockwise two pulses from the initial position to a position rotated counterclockwise six pulses from the initial position in terms of the number of normal rotation pulses.

More particularly, in the embodiment, the section that the main driving ring 5 is moved from the position rotated two pulses from the initial position to the position rotated six pulses from the initial position is an inverted area in which the on and off state of the spring switch 18 is inverted.

Figure 5:
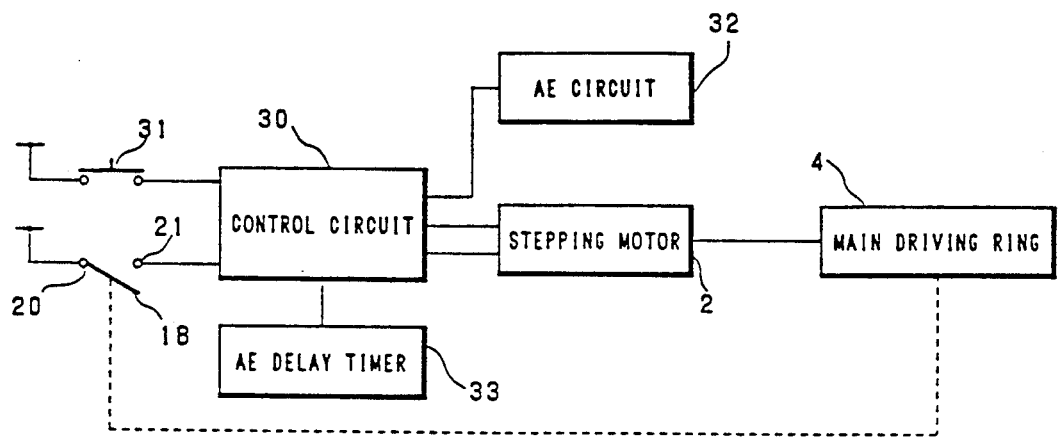
FIG. 5 is a block diagram of a control system used in the mechanism shown in FIG. 1.

FIG. 5 is a block diagram of a control system of the present invention. In FIG. 5, numeral 2 denotes the stepping motor 2, numeral 4 denotes the main driving ring 4, numral 18 denotes the spring switch, and numeral 20 and 21 denote the conductive elements. Mechanical connections are designated by the dotted line.

Further, numeral 30 denotes a control circuit which is controlled by a program, 31 a known release switch, 32 a known automatic exposure control circuit (hereinafter referred to as an AE circuit), and 33 an AE delay timer for setting a delay time until the AE circuit 32 is started after operation of the shutter blades.

Figure 7A:
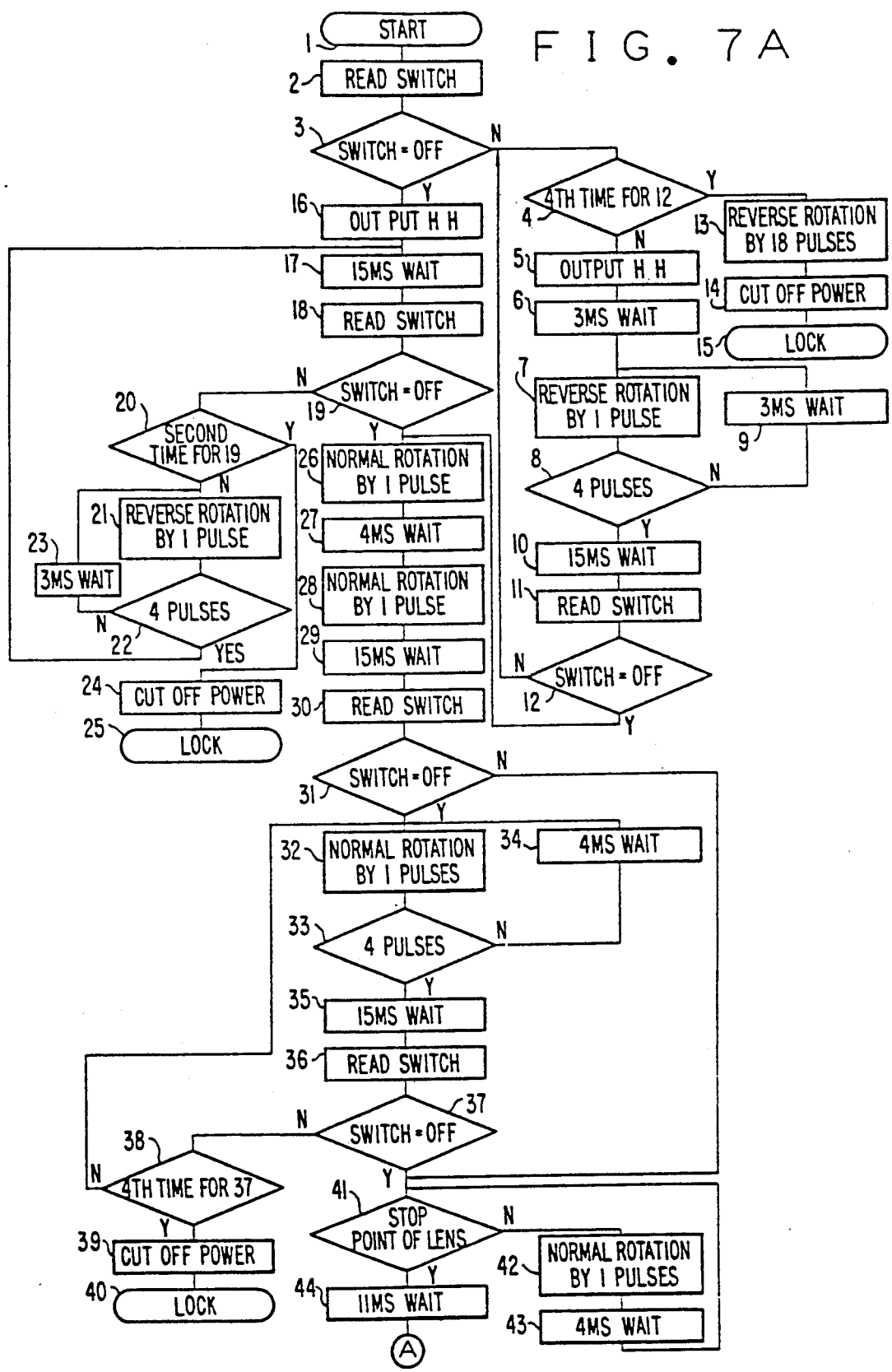
Figure 9:
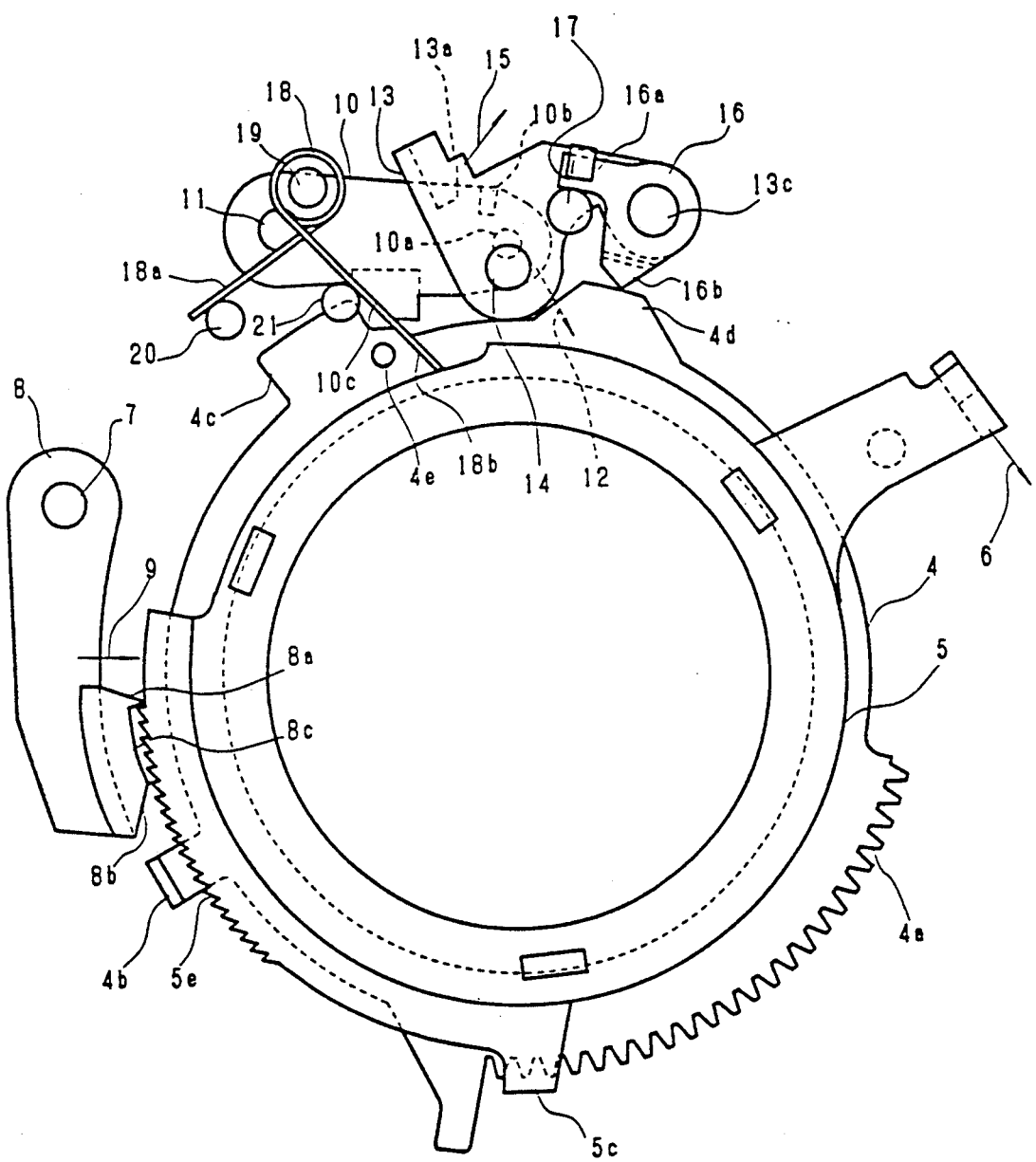
FIG. 9 is a plan view of the mechanism shown in FIG. 1 in a state where an open and close lever is moved in the opening direction.
Figure 10:
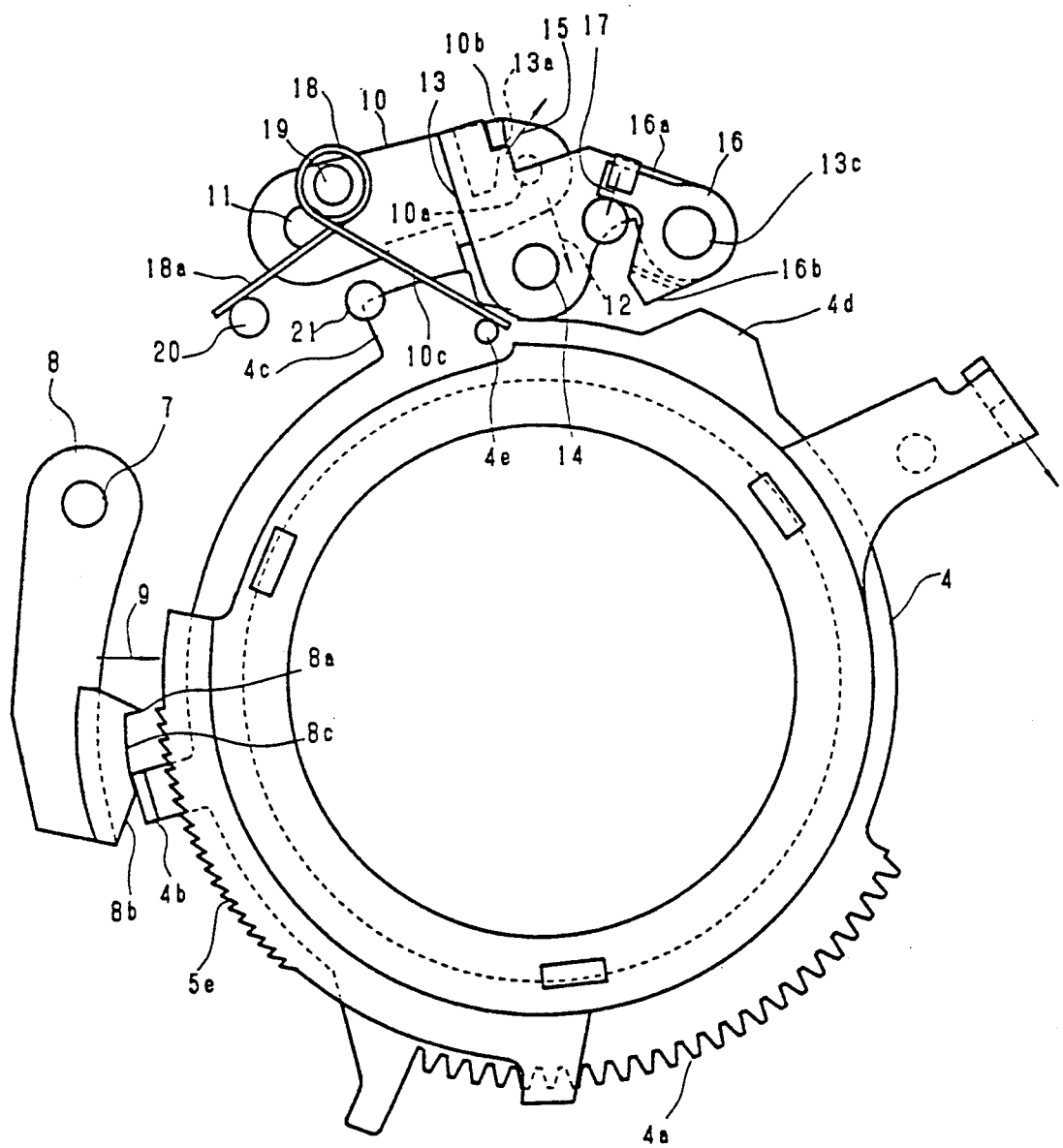
FIG. 10 is a plan view of the mechanism shown in FIG. 1 in a state just after the engagement of the lens driving ring is released.

The operation of the present embodiment will now described with reference to the above description, a timing chart of FIG. 6, a flow chart for control of FIG. 7A and FIG. 7B, and plan views of FIGS. 8 to 10.

Figure 8:
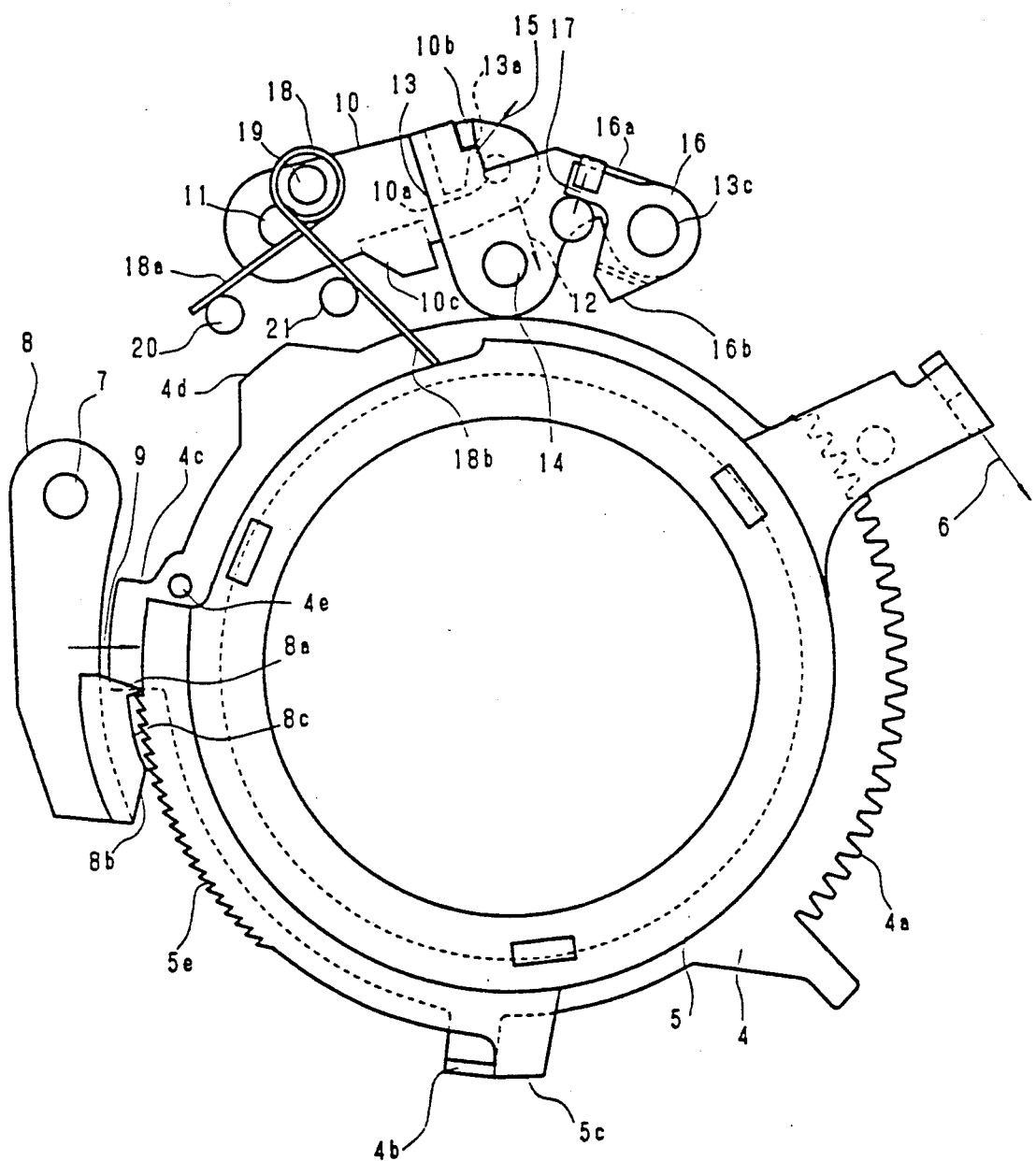
FIG. 8 is a plan view of the mechanism shown in FIG. 1 in a state where the lens driving ring is moved to the limit in the forward movement.

FIG. 8 is a plan view showing the lens driving ring rotated counterclockwise 19 steps which is a maximum stroke. FIG. 9 is a plan view showing a state in which the trigger arm 16b of the cam lever 16 rides on the trapezoidal cam 4d to open the blades (not shown) in the return course of the main driving ring 4. FIG. 10 is a plan view showing a state just after the main driving ring 4 is returned to the initial area to release the engagement of the ratchet gear 5e by the ratchet lever 8. In these figures, a gear train for transmitting the rotation of the stepping motor 2 to the main driving ring 4 is omitted.

First of all, in the normal initial state, the entire mechanism is in the state shown in FIG. 1 and the spring switch 18 is off.

When the release switch 31 is turned on, the program run and the control circuit 30 reads a state of the spring switch 18. When the switch 18 is off, a driving pulse for the stepping motor 2 is set to [H,H] of the initial phase and this state is maintained for 15 ms, for example (steps 1, 2, 3, 16 and 17 of FIG. 7, and point P1 of FIG. 6).

The normal operation should pass through the above program, while when the switch 18 is on for any reason at this time, the control circuit 30 rotates the stepping motor 2 reversely. When the switch 18 remains on even if the stepping motor 2 is reversely rotated, for example, 16 pulses, it is determined that a repair is required, and the power is cut off to lock the mechanism after the motor 2 is further reversely rotated 18 pulses (steps 4 to 15 of FIG. 7).

When 15 ms has elapsed in step 17 after the control circuit 30 sets the driving pulse to [H,H], the control circuit 30 reads a state of the switch 18 again (step 18 of FIG. 7).

This reading operation in step 18 is to confirm that the stepping motor 2 is in a stable state in the initial position. When the stepping motor 2 is in a stable state in the initial position, the switch 18 is off.

At this time, when the switch 18 is on, the stepping motor 2 is reversely rotated and even if the stepping motor 2 is reversely rotated, for example, 8 pulses, the switch 8 remains on, it is considered that a repair is required and the power is cut off to lock the machanism (steps 20 to 25 of FIG. 7).

When the switch 18 is off in step 19 of FIG. 7, the control circuit applies a normal rotation pulse of 4 ms and a normal rotation pulse of 15 ms to the stepping motor 2. The state of the normal rotation pulse of 15 ms is [L,L].

The stepping motor 2 is rotated two steps in response to the application of the normal rotation pulse and the rotation of the stepping motor 2 is transmitted through the pinion 1, the two-stage gear 3 and the rack 4a to the main driving ring 4 so that the main driving ring 4 is rotated counterclockwise (steps 26 to 29 of FIG. 7 and point P2 of FIG. 6).

The shelf portion 8c formed on the ratchet lever 8 is released or separated from the external surface of the bent portion 4b formed on the main driving ring 4 by the counterclockwise rotation of the main driving ring 4 and the ratchet lever 8 is rotated counterclockwise by the spring 9.

When 15 ms has elapsed in the state in which the normal rotation pulse is [L,L], the control circuit 30 reads a state of the switch 18 (step 30 and 31 of FIG. 7).

Since the insulative projection fixedly mounted to the main driving ring 4 is also rotated counterclockwise in response to the counterclockwise rotation of the main driving ring 4, the free end 18b of the switch 18 approaches the conductive element 21 by the resilience thereof. However, at time of point P2 of FIG. 6 in which the normal rotation pulse is first [L,L], since the free end 18b of the switch is not brought into contact with the conductive element 21, the switch is still off.

Thus, the control circuit 30 further rotates the stepping motor 2 by four steps by normal rotation pulse having a period of 4 ms. The control circuit 30 waits for 15 ms in the pulse state [L,L] in the fourth step and then reads a state of the switch 18 again (steps 32 to 36 of FIG. 7).

Since the free end 18b of the switch 18 comes into contact with the conductive element 21 during the normal rotation of the four steps, the switch 18 is on in the reading operation of step 36 of FIG. 7 after completion of the four-step normal rotation (point P4 of FIG. 6).

When the control circuit 30 confirms in the step 37 of FIG. 7 that the switch 18 becomes on, the control circuit 30 performs operations of step 41 et seq. of FIG. 7.

When the main driving ring 4 starts its movement from a position advanced from the initial position for any reason (for example, when the main driving ring 4 starts its movement from around the point P3 of FIG. 6), there is a case where the main driving ring 4 is rotated counterclockwise to the point P4 of FIG. 6 to turn on the switch 18 in the reading operation of the switch 18 in step 30 of FIG. 7 before the shift to the four-step normal rotation. In such a case, the process proceeds from step 31 to step 41 of FIG. 7 immediately without the four-step normal rotation.

On the contrary, when the main driving ring 4 can not be rotated counterclockwise for any reason in the four-step normal rotation of the stepping motor 2, a case where the switch 18 is not on in the reading operation of step 36 of FIG. 7 is considered.

In such a case, the control circuit 30 supplies a further four-step normal rotation pulse to the stepping motor 2 and reads an output of the switch 18. When the switch 18 is not turned on even if the additional reading operations are repeated three times, the power is cut off and the mechanism is locked (step 38 to 40 of FIG. 7).

The control circuit 30 continues to supply the normal rotation pulses having a period of 4 ms to the stepping motor 2 in step 41 et seq. of FIG. 7. When the main driving ring 4 reaches the point P5 of FIG. 6 rotated counterclockwise ten steps from the initial position, the bent portion 4b formed on the main driving ring 4 abuts against the engagement protrusion 5c formed on the lens driving ring 5 so that the lens driving ring 5 is rotated counterclockwise to follow the main driving ring 4. The lens barrel 22 is pulled out in accordance with the counterclockwise rotation of the lens driving ring.

When the lens driving ring 5 is rotated counterclockwise to a desired focused position, the control circuit 30 maintains the pulse state at this time for 15 ms and waits until the focused position is stable (step 44 of FIG. 7). In this connection, in the step 44 of FIG. 7, the waiting time is described as 11 ms, while a pulse time of 4 ms in step 43 is added thereto and the total waiting time at the focused position is 15 ms.

In the counterclockwise rotation of the main driving ring 4 described above, the opening and closing lever 10 is released or disengaged from the hold projection 4c formed on the main driving ring 4. Further, the trapezoidal cam 4d formed on the main driving ring 4 has passed the trigger arm 16b of the cam lever 16, while since the trigger arm 16b rides over the trapezoidal cam 4d by the clockwise rotation of the cam lever 16, the opening and closing lever 10 is stopped at the state where the square pin 10b is engaged with the notch 13a of the engagement lever 13 and the shutter blades 25 and 26 maintain the closed state.

FIG. 8 shows a state in which the lens driving ring 5 has been rotated counterclockwise 19 steps which is the maximum number of rotation steps of the embodiment as described above. The point P6 of FIG. 6 corresponds to this state.

After waiting for 15 ms in step 44 of FIG. 7, the control circuit 30 applies a reverse rotation pulse having a period of 3 ms to the stepping motor 2 to rotate the main driving ring 4 clockwise (steps 45 to 47 of FIG. 7).

The engagement protrusion 5c of the lens driving ring 5 is disengaged from the bent portion 4b of the main driving ring 4 in response to the clockwise rotation of the main driving ring 4, while the ratchet gear 5e is engaged with the click 8a of the ratchet lever 8 so that the lens driving ring 5 is stopped at the focused position.

The control circuit 30 waits for 15 ms at the point P7 of FIG. 6 reached by rotating the main driving ring 4 by the step number obtained by adding one to the set stage number of lens (step 48 of FIG. 7) and thereafter the main driving ring 4 is reversely rotated by four pulses to reach the point P9 of FIG. 6 (steps 49 to 51 of FIG. 7).

When the main driving ring 4 is rotated counterclockwise to the point P8 of FIG. 6 in the reverse rotation of the main driving ring 4 in steps 49 to 51 of FIG. 7, the trigger arm 16b of the cam lever 16 rides on the top of the trapezoidal cam 4d from the right inclined surface of the cam 4d formed on the main driving ring 4 and the cam lever is rotated counterclockwise about the shaft 14 together with the engagement lever 13 while the operation arm 16a is engaged with the pin 13b fixedly mounted to the engagement lever 13.

Accordingly, since the square pin 10b mounted to the opening and closing lever 10 is released from the engagement by the notch 13a of the engagement lever 13, the opening and closing lever 10 is rotated counterclockwise by the spring 12. Thus, the shutter blade 25 is rotated clockwise about the shaft 25b and the shutter blade 26 is rotated counterclockwise about the shaft 26b so that the exposure aperture AP is opened.

Subsequently, the control circuit 30 operates the AE delay timer 33 at the timing reached by rotating the main driving ring 4 clockwise to the point P9 of FIG. 6 and starts the AE circuit 32 at the timing of the point P10 of FIG. 6 after the elapse of the set time of the timer 33 and stops the reverse rotation of the stepping motor 2 (steps 52 to 54 of FIG. 7).

The timing at which the AE circuit 32 is started at the point P10 of FIG. 6 after the cam lever 16 has been operated at the point P8 of FIG. 6 is determined in consideration of a so-called mechanical delay of the shutter mechanism.

The AE circuit 32 produces an exposure termination signal at the timing of the point P11 corresponding to the brightness of an object to be photographed. When the exposure termination signal is received, the control circuit 30 reads a state of the switch 18. When the switch 18 is on, a logic 0 is set in a flag register (not shown), while when the switch 18 is off, a logic 1 is set in the flag register. Thereafter, the stepping motor 2 is applied with the reverse rotation pulse having a period of 3 ms corresponding to six steps to rotate the main driving ring 4 clockwise by six steps and the control circuit 30 waits for 30 ms at the point P15 of FIG. 6 corresponding to the initial position (steps 55 to 64 of FIG. 7).

The hold projection 4c formed on the main driving ring abuts against the cam surface 10c (refer to FIG. 8) formed on the opening and closing lever 10 at the point P12 of FIG. 6 in the clockwise rotation of the main driving ring 4 to rotate the opening and closing lever 10 counterclockwise. Accordingly, the shutter blade 25 is rotated counterclockwise about the shaft 25b and the shutter blade 26 is rotated clockwise about the shaft 26b to close the exposure aperture AP. Further, when the trigger arm 16b is disengaged from the trapezoidal cam 4d formed on the main driving ring 4, the engagement lever 13 is rotated clockwise by the spring 15 and the notch 13a of the lever 13 is engaged with the square pin 10b of the opening and closing lever 10.

Further, the bent portion 4b formed on the main driving ring 4 abuts against the cam surface 8b formed on the ratchet lever 8 at the point P13 of FIG. 6 in the clockwise rotation of the main driving ring 4 and the bent portion 4b abuts against the shelf portion 8c at the timing of the next point P14. Accordinly, the engagement of the ratchet gear 5e by the ratchet lever 8 is released and the lens driving ring 5 is rotated clockwise by the spring 6. FIG. 10 shows a state just after the engagement of the ratchet gear 5e by the ratchet lever 8 has been released in this manner.

On the other hand, when the clockwise rotation of six steps from the point P9 is terminated at the point P15, the control circuit 30 maintains the pulse state [H,H] at this time for 30 ms and thereafter reads a state of the switch 18 (step 65 of FIG. 7).

As far as the apparatus is operated normally, the main driving ring 4 is returned to the initial position at the point P15 of FIG. 6. Accordingly, the free end 18b of the switch 18 is separated from the conductive element 21 by the insulative projection 4e fixedly mounted to the main driving ring 4 and the switch 18 is off. However, if the main driving ring 4 is not returned to the initial position for any reason and the switch remains on, the control circuit 30 further supplies the reverse rotation pulse to the stepping motor 2. When the switch 18 remains on even if the reverse rotation pulses corresponding to, for example, 12 pulses are supplied, it is determined that unreturnable failure occurs and after the power is cut off, the entire mechanism is locked (steps 66 to 72 of FIG. 7).

On the other hand, when the switch 18 is off, the process proceeds to the step 73 of FIG. 7 and the control circuit 30 checks the content of the flag register.

The flag register is set in the steps 57 to 59 of FIG. 7 as described above. The situation in the case where the flag register is set in the steps 57 to 59 is reviewed.

First of all, in the case where the main driving ring 4 and the lens driving ring 5 have performed the normal forward movement and the normal reverse movement within the effective focus adjusting area of the photographing lens, the main driving ring 4 positions at the point P9 of FIG. 6 in the reading of the switch 18 at the step 56 of FIG. 7. Since the point P9 exists just before the area in which the switch 18 is inverted from the on state to the off state, the switch 18 is in the on state yet. Accordingly, a logic 0 has been set in the flag register.

On the other hand, in the case where the main driving ring 4 and the lens driving ring 5 can not be advanced to a desired focused position due to accumulated dust around a lens barrel or positional failure of a lens barrier and the photographing operation has been made at a trouble position existing before a primary focused position and near the initial position, the main driving ring 4 and the lens driving ring 5 are returned from the trouble occurrence position existing before the primary focused position and near the initial position. Accordingly, the main driving ring 4 has been returned near the initial position as compared with the point P9 of FIG. 6 in the reading of the switch 18 at the step 56 of FIG. 7. (Normally, it is expected that the rings are returned to the point P14 having the same phase as [L,L] of the phase at the point P9 or the point P15 which is the origin.)

The points P14 and P15 exist after passage of the area where the switch 18 is inverted from the on state to the off state. Accordingly, the switch 18 is already off and thus a logic 1 has been set in the flag register. Accordingly, the control circuit 30 determines that the photography has been made exactly when it is recognized that a logic 0 is set in the flag register in the step 73 of FIG. 7 and terminates all of the processing after cutting of the power (step 76 and 77 of FIG. 7).

On the other hand, the control circuit 30 determines that the photographing lens can not be pulled out to a proper focused position due to accumulated dust or positional failure of the lens barrier when it it recognized that a logic 1 is set in the flag register in the step 73 of FIG. 7 and locks the entire mechanism, for example, after cutting off the power and produces an alarm (step 74 and 75 of FIG. 7).

As described above, according to the first embodiment of the present invention, the positional sensor for detection of the initial position of the main driving member directly coupled with the stepping motor can be used to confirm the operation of the lens driving member and failure of all photographic frames after the occurrence of a focusing failure, due to a failure of pulling out of the lens driving member is prevented.

A second embodiment of the present invention is now described with reference fo FIGS. 11 to 17.

In the second embodiment, the positional sensor for detection of the initial position of the lens driving ring 5 is used to substantiallly detect the initial position of the main driving ring 4 coupled through a gear to the stepping motor 4.

Since many of the mechanical elements of the second embodiment are common to the mechanical elements of the first embodiment described above, a description concerning the common points is omitted and different points are described hereinafter.

(1) In the second embodiment, the lens driving ring 5 is normally rotated to follow the main driving ring 4 after supplying two rounds of a normal rotation pulse train, each round formed of four pulses, to the stepping motor 2 from a state in which the main driving ring 4 is in the initial position.

Figure 11:
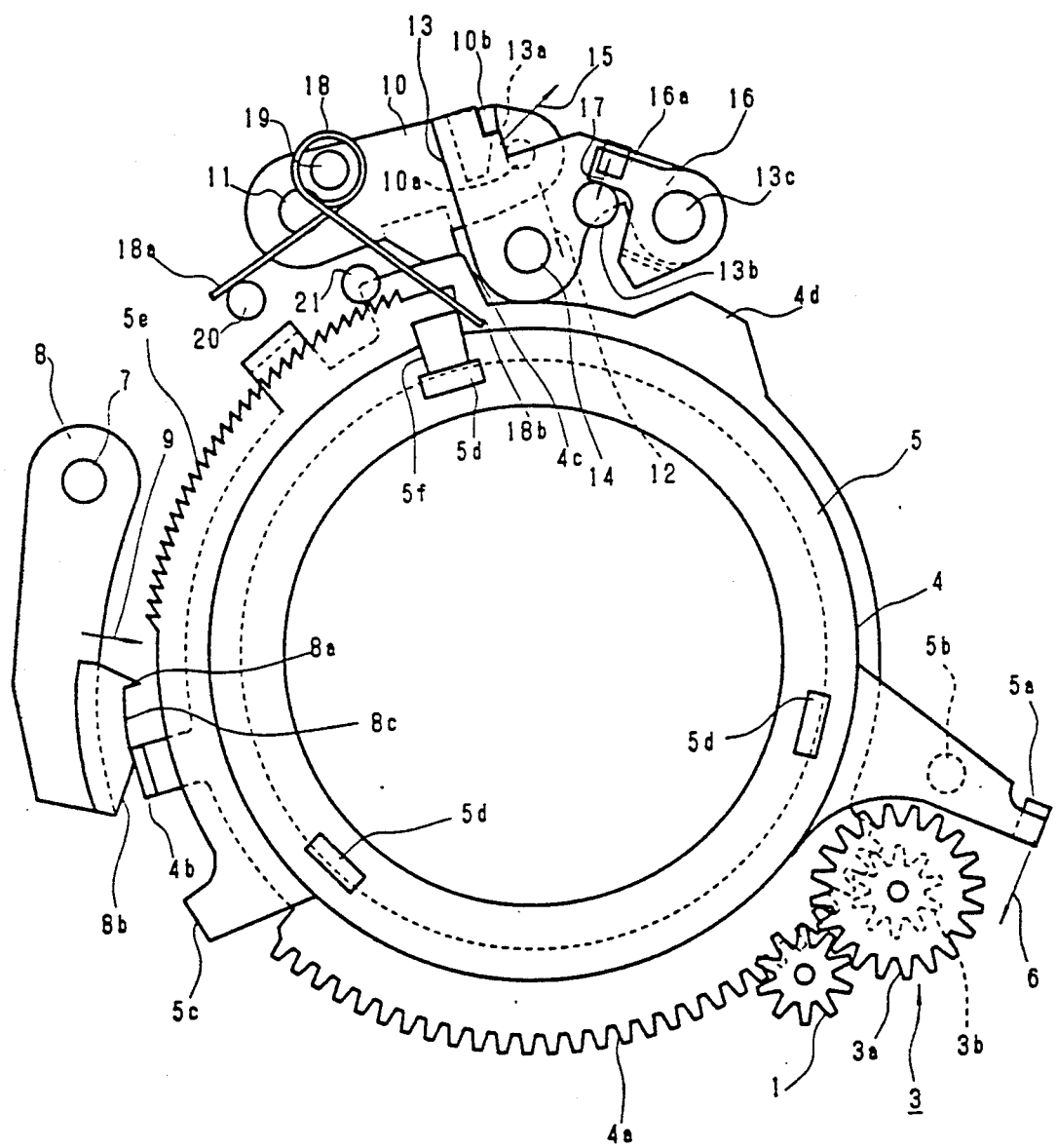
FIG. 11 is a plan view showing an initial state of a lens shutter driving mechanism using a lens driving mechanism according to another embodiment of the present invention.

More particularly, when a normal rotation pulse train starting with [H,H] from the initial state shown in FIG. 11 is applied to the stepping motor 2, the bent portion 4b formed on the main driving ring 4 abuts against the engagement protrusion 5c formed on the lens driving ring 5 from the time when the pulse state is the second [H,H] (however, [H,H] at the initial position is not counted) so that the lens driving ring 5 is normally rotated to follow the main driving ring 4.

(2) In the second embodiment, even when the lens driving ring 5 starts to be rotated normally (counterclockwise) so that the lens barrel 22 is pulled out, the lens barrel 22 does not reach the effective focus adjusting area immediately and when the normal rotation pulse train supplied to the stepping motor 2 is further rounded, the lens barrel 22 reaches the effective focus adjusting area.

(3) In the second embodiment, an insulative projection 5f provided in the lens driving ring 5 separates the free end 18b of the spring switch 18 from the conductive element 21 instead of the insulative projection 4e formed on the main driving ring 4 in the first embodiment. The insulative projection 5f is positioned so that the free end 18b of the spring switch is brought into contact with the conductive element 21 while the lens driving ring 5 is normally rotated by one round in terms of the normal rotation pulse train from the initial position of the lens driving ring 5.

(4) In the return course of the main driving ring 4, when the main driving ring 4 is returned within one round in terms of the pulse train from the initial position (actually, the second pulse from the initial position), the bent portion 4b of the main driving ring 4 rides on the shelf portion 8c from the cam surface 8b of the ratchet lever 8 and the lens driving ring 5 is returned to the initial position.

(5) The set number of teeth of the ratchet gear 5e formed on the lens driving ring 5 is thirty. This relates to only the resolution of the automatic focusing mechanism and is not an essential matter.

(6) The basis period of the driving pulse is 4 ms in the normal rotation and is 3 ms in the reverse rotation in the first embodiment, while it is 3 ms in both of the normal rotation and the reverse rotation in the second embodiment. However, this is not an essential matter.

Figure 12:
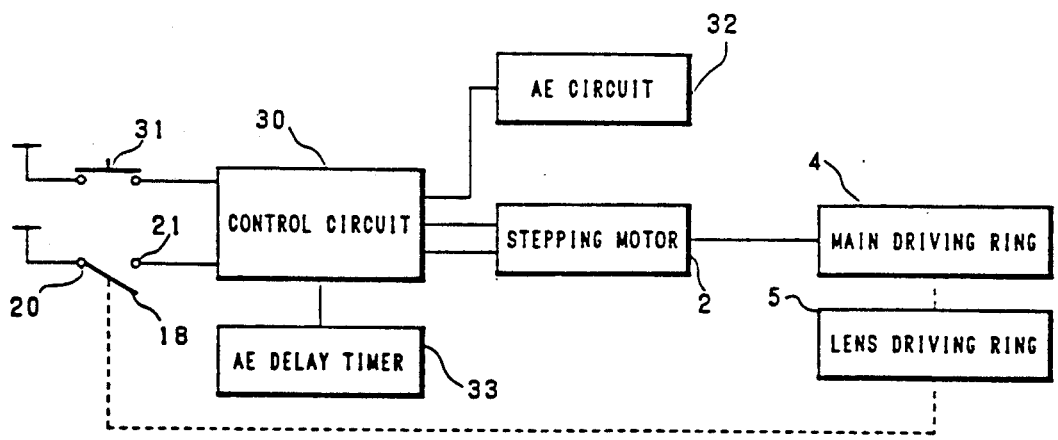
FIG. 12 is a block diagram of a control system of the mechanism shown in FIG. 11.

(7) The lens driving ring 5 is shown in FIG. 12 corresponding to FIG. 5 in the first embodiment, since the insulative projection 5f for operating the spring switch 18 is formed on the lens driving ring 5.

The operation of the second embodiment will now described.

In the normal initial state, the entire mechanism is in the state shown in FIG. 11 and the switch 18 is in the off state.

When the release switch is turned on, the control circuit 30 reads a state of the spring switch 18. When the switch 18 is off, the driving pulse for the stepping motor 2 is set to [H,H] in the initial state and this state is maintained for 15 ms, for example. (Steps 1, 2, 3, 13 and 14 of FIG. 14 and point P1 of FIG. 13.)

At this time, when the switch 18 is on for any reason, the control circuit 30 rotates the stepping motor 2 reversely by 25 pulses, for example, and thereafter reads a state of the switch 18. At this time, when the switch 15 is on, it is determined that a repair is required and the mechanism is locked (steps 4 to 12 of FIG. 14).

Figure 14A:
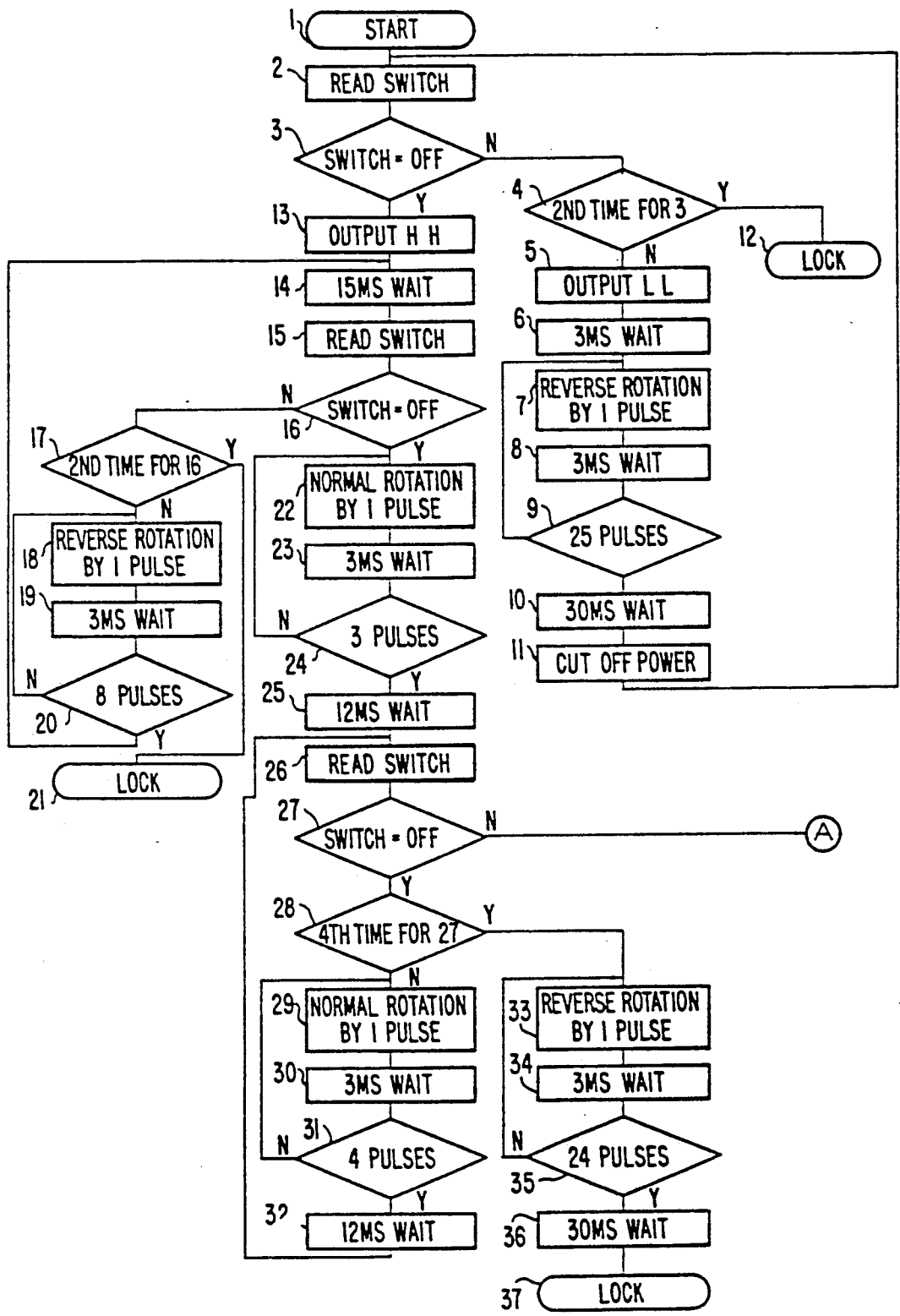
FIGS. 14A and 14B are a flow chart showing control of the mechanism shown in FIG. 11.
Figure 14B:
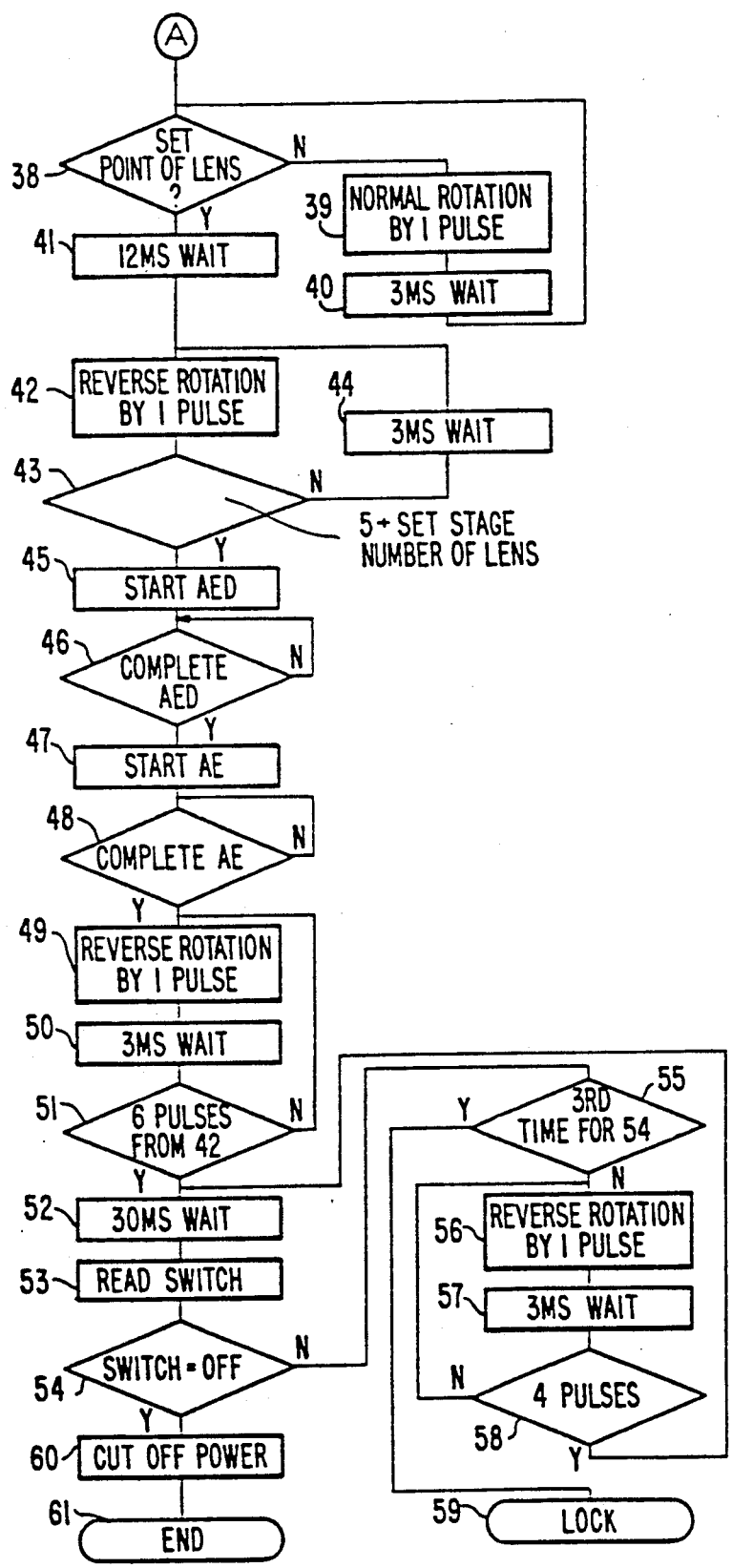

When 15 ms elapses in the state where the driving pulse is [H,H] in the step 14 of FIG. 14, the control circuit 30 reads a state of the switch 18 again and confirms that the main driving ring 4 is stable in the initial position (steps 15 and 16 of FIG. 14). At this time, when the switch 18 is on, the control circuit 30 rotates the stepping motor 2 reversely by eight pulses and reads a state of the switch again. Nevertheless, when the switch 18 remains on, it is determined that a repair is required and the mechanism is locked (steps 17 to 21 of FIG. 14).

In this case, the reason why the stepping motor 2 is reversely rotated by eight pulses is described as follows.

In the embodiment, the pulse train applied to the stepping motor 2 is rounded by four pulses. When the main driving ring 4 is rotated counterclockwise by two rounds (that is, eight pulses) from the initial position, the lens driving ring 5 starts to be rotated counterclockwise and the switch 18 is turned on by the counterclockwise rotation of the lens driving ring 5. Accordingly, when the switch 18 is turned on due to the fact that the driving pulse is set to [H,H] in the step 13 of FIG. 14, it is considered that the main driving ring 4 is advanced to the position in which the main driving ring 4 can be engaged with the lens driving ring 5 (that is, the position of the second round [H,H] rotated counterclockwise by eight steps from the initial position) by the pulse state of [H,H] in the step 13 of FIG. 14. Thus, when the switch 18 is on even if the stepping motor 8 is reversely rotated by eight steps, it is determined that a repair is required and the mechanism is locked.

When the switch 18 is off in the step 16 of FIG. 14, the control circuit 30 applies three normal rotation pulses having a period of 3 ms to the stepping motor 2 and waits for 15 ms in the pulse state [L,H] of the third pulse (which is a fourth pulse when [H,H] corresponding to the initial position is counted as the first pulse) (steps 22 to 25 of FIG. 14).

In the step 25 of FIG. 14, the waiting time is described as 12 ms, while when the pulse time of 3 ms for the third pulse (step 23) is added to the waiting time of 12 ms, the pulse state of [L,H] is 15 ms.

The ratchet lever 8 is rotated counterclockwise by the spring 9 in accordance with the counterclockwise rotation of the main driving ring 4.

When the main driving ring 4 starts to be rotated normally from the initial position, the main driving ring 4 reaches the point P2 passing the initial area of FIG. 13 by the rotation corresponding to the three pulses. The control circuit 30 waits for 15 ms in the state in which the normal rotating pulse is [L,H] and thereafter determines a state of the switch 18 (steps 26 and 27 of FIG. 14).

At the time of the point P2 of FIG. 13 in which the normal rotation pulse is first [L,H], the main driving ring 4 is not in the state in which the main driving ring 4 is engaged with the lens driving ring 5 and accordingly the switch 18 is still off.

The control circuit 30 further rotates the stepping motor 2 by four steps and waits for 15 ms in the pulse state of [L,H] in the second time. Therefore, the control circuit 30 checks a state of the switch 18 again (steps 28-27 of FIG. 14).

The main driving ring 4 passes the running area of FIG. 13 by the normal rotation of four steps and the bent portion 4b abuts against the engagement protrusion 5c (point P3 of FIG. 4). However, at this time, the lens driving ring 5 is not in the state in which the lens driving ring 5 is rotated counterclockwise and accordingly the switch 18 is still off.

Thus, the control circuit 30 further rotates the stepping motor 2 by four steps and waits for 15 ms in the pulse state of [L,H] in the third time. Thereafter, the control circuit 30 reads a state of the switch 18 again (steps 28-27 of FIG. 14).

When the normal rotation in which one round includes four steps comes into the third round, the main driving ring 4 is rotated counterclockwise in the state in which the bent portion 4b is engaged with the engagement protrusion 5c of the lens driving ring 5 and accordingly the lens driving ring 5 is rotated counterclockwisa against the spring 6.

Accordingly, the insulative projection 5f formed on the lens driving ring 5 is also rotated counterclockwise and the free end 18b of the switch 18 is moved left in the figure by the resilience of the switch itself. Thus, the switch 18 is turned on at the point P4 of FIG. 4 which is a final step in the normal rotation of the third round.

When the control circuit 30 confirms that the switch 18 is turned on, the process proceeds to the step 38 et seq. of the flow chart.

In the embodiment, at the point P4 of FIG. 4 in which the third normal rotation of the stepping motor 2 has been completed, the lens driving ring 5 is designed so that the lens barrel 22 reaches the position at infinity.

In the embodiment, the switch 18 ensures the area corresponding to four steps (point P3 to P4 of FIG. 13) in terms of the rotational step number of the stepping motor 2 as the inversion area and the state of the switch 18 is read at the final step of the four-step area. Accordingly, even if the mounting position of the switch 18 and the conductive elements 20 and 21 is slightly wrong, the state of the switch 18 is stable at the timing of reading the state of the switch 18. Further, even if chattering is produced in the switch 18, the chattering of the switch 18 is reduced at the timing of reading the state of the switch 18.

On the other hand, when the switch 18 remains off even after the normal rotation in which one round includes four steps has been completed three rounds, the control circuit 30 normally rotates the stepping motor 2 by further four steps and confirms the content of the switch 18. If the switch 18 remains off, the stepping motor 2 is reversely rotated by 24 pulses, for example, and thereafter it is determined that a repair is required and the mechanism is locked (steps 28, 33 to 37 of FIG. 14).

When the main driving ring 4 is normally rotated to the point P4 of FIG. 13 and the switch 18 is turned on, the control circuit 30 applies the normal rotation pulse having a period of 3 ms to the stepping motor 2 in steps 38 to 40 of FIG. 14 to rotate counterclockwise the main driving ring 4 and the lens driving ring 5 to a desired focused position. When the lens driving ring 5 is rotated counterclockwise to the focused position, the control circuit 30 maintains the pulse state at this time for 15 ms and waits until the focused position is stable (step 41 of FIG. 14).

Figure 15:
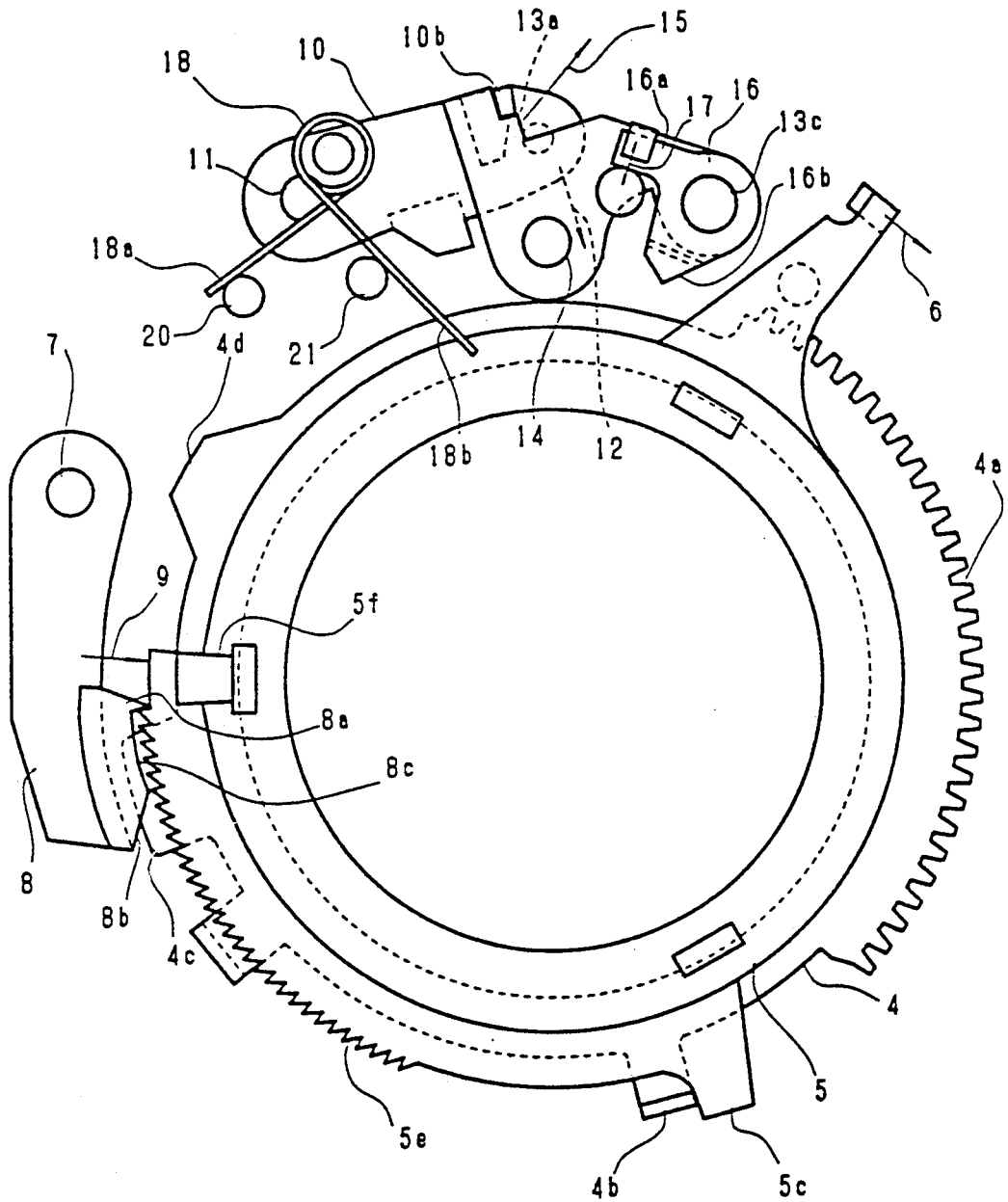
FIG. 15 is a plan view of the mechanism shown in FIG. 11 in a state where the lens driving ring is moved to the limit in the forward movement.

FIG. 15 shows a state in which the lens driving ring 5 has been rotated counterclockwise by 30 steps which is the maximum number of steps in the embodiment. The point P5 of FIG. 13 corresponds to this state.

After waiting 15 ms in the step 41 of FIG. 14, the control circuit 30 applies the reverse rotation pulse having a period of 3 ms to the stepping motor 2 to rotate the main driving ring 4 clockwise (steps 42 to 44 of FIG. 14).

Further, even when the main driving ring 4 is rotated clockwise, the ratchet gear 5e is engaged with the ratchet lever 8 and the lens driving ring 5 is stopped at the focused position.

The reverse rotation in the steps 42 to 44 of FIG. 14 is made until the main driving ring 4 is rotated clockwise by the step number obtained by adding five to the set stage number of the lens. The set stage number of the lens is counted from the point P4 of FIG. 13 and accordingly the main driving ring 4 is rotated clockwise to the point P6 of FIG. 13 by the reverse operation.

Figure 16:
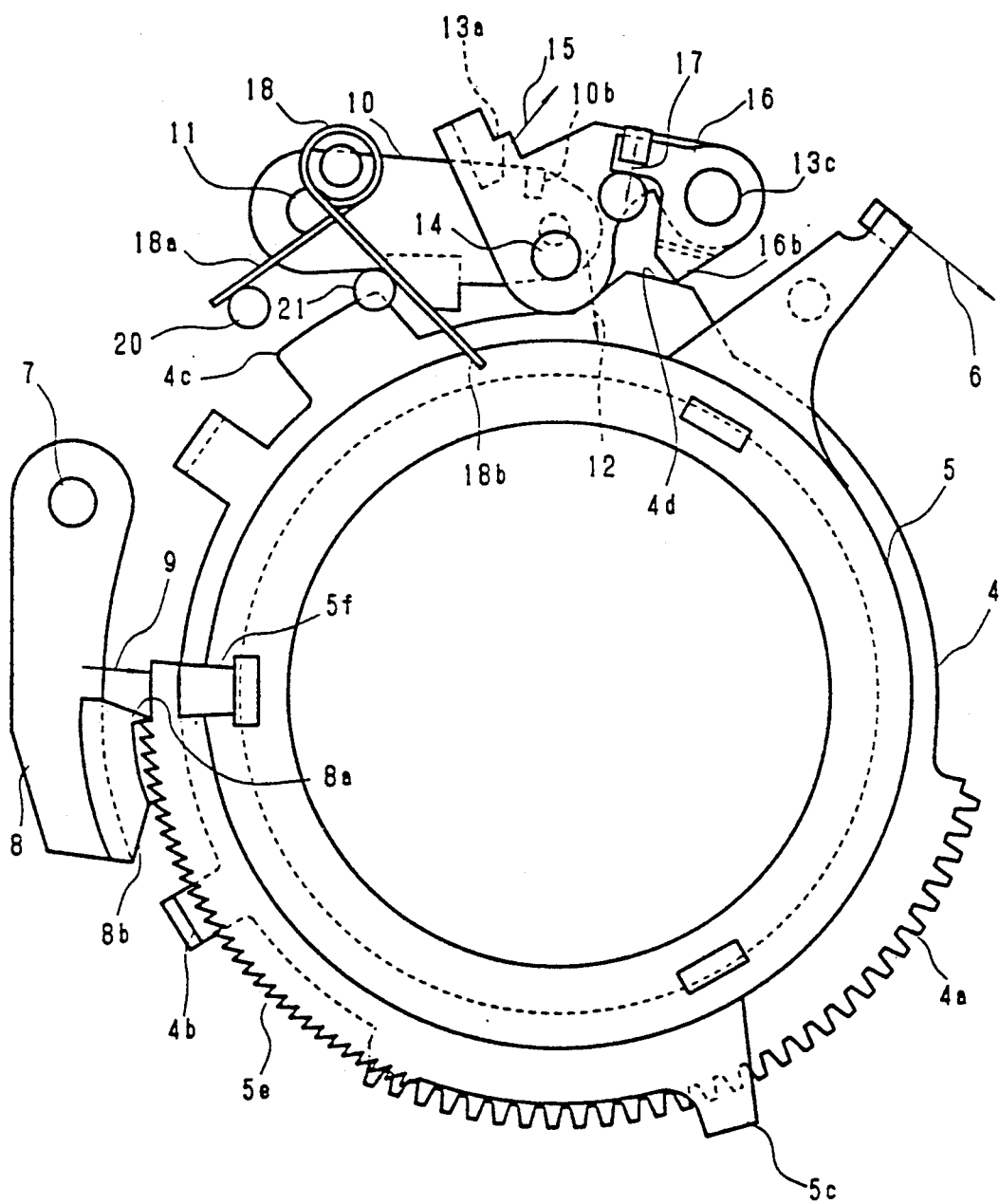
FIG. 16 is a plan view of the mechanism shown in FIG. 11 in a state where an open and close lever is moved in the opening direction.

When the clockwise rotation of the main driving ring 4 reaches the point P6 of FIG. 13, the trigger arm 16b of the cam lever 16 rides on the top of the trapezoidal cam 4d of the main driving ring 4 from the right inclined surface thereof as shown in FIG. 16. Accordingly, in the same manner as the first embodiment, the shutter blades 25 and 26 open the exposure aperture AP.

Further, when the control circuit 30 rotates clockwise the main driving ring 4 to the point P6 of FIG. 4, the control circuit 30 operates the AE delay timer 33 and starts the AE circuit 33 at the point P7 of FIG. 13 after the set time of the timer 33 has elapsed (steps 45 to 47 of FIG. 14).

When the AE circuit 33 produces the exposure termination signal at the point P8 of FIG. 13 corresponding to the brightnes of the object to be photographed, the control circuit 30 applies the reverse rotation pulse having a period of 3 ms to the stepping motor 2 by further six steps and the main driving ring 4 is rotated clockwise by a further six steps (steps 48 to 51 of FIG. 14).

When the main driving ring reaches the point P9 of FIG. 13 in the clockwise rotation, the hold projection 4c rotates counterclockwise the opening and closing lever 10 so that the shutter blades 25 and 26 close the aperture AP.

When the main driving ring reaches the point P10 of FIG. 13 in the clockwise rotation, the bent portion 4b of the main driving ring 4 abuts against the cam surface 8b of the ratchet lever 8 and subsequently the bent portion 4b rides on the shelf portion 8c at the timing of the point P11. Accordingly, the engagement of the ratchet gear 5e by the ratchet lever 8 is released.

As is apparent from FIG. 13, the main driving ring 4 is returned to the second step from the initial position in terms of the rotational step number of the stepping motor at the point P11. That is, when the ratchet gear 5e has been released from the ratchet lever 8, the main driving ring 4 is returned within the initial area.

Figure 17:
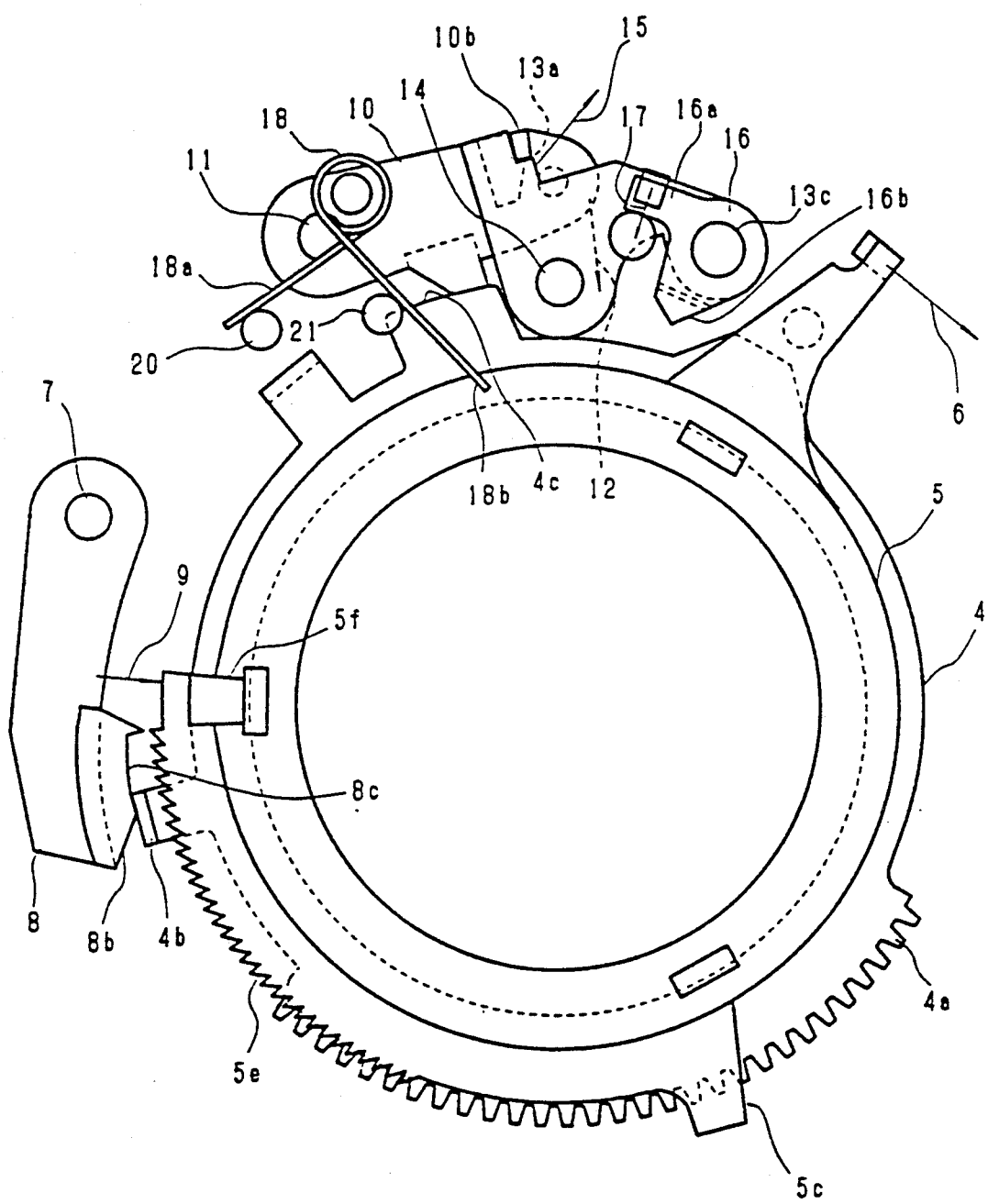
FIG. 17 is a plan view of the mechanism shown in FIG. 11 in a state just after the engagement of the lens driving ring is released.

FIG. 17 shows a state just after the engagement of the ratchet gear 5e by the ratchet lever 8 has been released. The lens driving ring 5 is rotated clockwise by the spring 6 from this state to be returned to the initial position.

On the other hand, when the clockwise rotation of six steps from the point P8 is terminated, the control circuit 30 maintains the pulse state at this time for 30 ms and thereafter reads the state of the switch 18 (steps 52 and 53 of FIG. 14).

As far as the mechanism is operated normally, the lens driving ring 5 returns to its initial position by the clockwise rotation by the spring 6 during the waiting time of 30 ms. The insulative projection 5f of the lens driving ring 5 separates the free end 18b of the switch 18 from the conductive element 21 while the lens driving ring 5 is returned to the initial position. Accordingly, the switch is off in the reading of the step 53 of FIG. 14 as long as there is no trouble.

When the control circuit 30 confirms that the switch 18 is off, the control circuit 30 determines that the exact initial return operation has been made and cuts off all of the power to terminate the photographing operation (step 54, 60 and 61 of FIG. 14).

At this time, when the switch 18 remains on, the control circuit 30 supplies the reverse rotation pulse having a period of 3 ms to the stepping motor 2. When the switch 18 remains on even if the reverse rotation pulse is supplied to the stepping motor 2 by eight pulses, it is determined that a trouble such as failure in returning the lens driving ring 5 occurs and the entire mechanism is locked (steps 55 to 59 of FIG. 14).

As is apparent from the foregoing description, the second embodiment is to directly confirm the initial return operation of the lens driving ring 5 and is not to detect the initial return operation of the main driving ring 4 and the stepping motor 2.

However, in the second embodiment, the lens driving ring 5 is adapted to be returned to the initial position subject to the fact that the main driving ring 4 is returned from the exact initial position to the second step.

Accordingly, the fact that the lens driving ring 5 has been returned to the initial position represents that the main driving ring 4 has been returned from the exact initial position to within the second step. That is, the main driving ring 4 is returned within the initial area completely.

In the next photographing operation, the normal rotation pulse supplied to the stepping motor 2 starts from [H,H], while the main driving ring 4 is moved to any of the next [H,H] of the point P2 or the point P1 of FIG. 4 when the normal rotation pulse [H,H] is applied in the case where the normal rotation pulse starts from [H,H] as long as the main driving ring 4 is in the initial area.

When the main driving ring 4 is moved to the point P1 of FIG. 4, the main driving ring 4 passes the initial area and the running area to rotate the lens driving ring 5 counterclockwise from the point P3 by the normal rotation pulse train subsequent to [H,H] as described above.

When the main driving ring 4 is moved to a portion of the next [H,H] of the point P2 of FIG. 4, the main driving ring 4 passes the running area immediately to rotate the lens driving ring 5 counterclockwise from the point P3 by the normal rotation pulse train subsequent to [H,H], while since the subsequent sequence is controlled starting from the operation of the switch 18 in accordance with the normal rotation of the lens driving ring 5, the accuracy of positioning the lens is not affected.

In this manner, in the second embodiment, the positional sensor for detecting the initial position of the lens driving ring can be used to substantially detect the initial position of the main driving ring.

An amount of movement of the driving ring necessary to invert the on and off state of the positional sensor is converted into a plurality of steps in terms of the driving pulse number regardless of the provision of the positional sensor in the main driving ring or the lens driving ring. The state of the positional sensor is read at the final step and the pulse time is relatively extended at the reading timing. Accordingly, even if the mounting position of the positional sensor is slightly wrong, the positional sensor is exactly operated at the reading timing and even if the positional sensor produces chattering, the chattering is suppressed at the reading timing.

In the foregoing description, while the present invention is applied to a so-called program shutter having the function of the diaphragm blade, it is apparent that the present invention can be applied to a single lens shutter providing the diaphragm blade separately.

In the foregoing description, since it is assumed that the stepping motor of the four-magnetic pole two-phase excitation system is used, the pulse train is rounded by four steps, while it is a matter of course that the step number required for one round of the pulse train is different depending on the number of magnetic poles and the pulse train number and correspondingly the width of the initial area and the running area is different.

What is claimed is:

1. A lens shutter driving mechanism using a lens driving mechanism comprising:
   a stepping motor for rotating in normal and reverse directions in accordance with a phase order of a sequentially supplied pulse train;

a main driving member coupled with said stepping motor to be driven in a forward direction and a return direction in accordance with the rotational direction of said stepping motor;

a blade driving member coupled with a shutter blade and disposed adjacent a moving line of said main driving member to open and close the shutter blade;

a blade driving member starting member formed in said main driving member so as to not operate said blade driving member in the forward movement of said main driving member from its initial position and to operate said blade driving member in the return movement of said main driving member to its initial position;

a lens driving member urged to move in the return direction of said main driving member and advanced to follow said main driving member after said blade driving member starting member formed in said main driving member has passed by said blade driving member in the forward movement of said main driving member to drive a focus adjusting lens group;

an arrangement member for engaging said lens driving member so as to not prevent the forward movement of said lens driving member and to restrict the return movement of said lens driving member;

an engagement release portion formed in said main driving member to release the engagement of said lens driving member by said engagement member after said blade driving member starting member has operated said blade driving member in the return movement of said main driving member;

a positional sensor for indentifying a first state in which said main driving member is in its initial position and a second state in which said main driving member is in a position advanced from the initial position; and control means for controlling a normal pulse and a reverse pulse supplied to said stepping motor to control the normal rotation and the reverse rotation of said stepping motor and for confirming the initial position of said main driving member in accordance with an output of said positional sensor, wherein said control means controls an amount of normal rotation of said stepping motor counted from a timing in which a logic of said positional sensor is inverted from the first state to the second state when said stepping motor is rotated in the normal direction and reads a state of said positional sensor at a timing in which reverse rotation pulses having a number necessary to return said main driving member to a position just before the logic of said positional sensor is inverted from the second state to the first state are supplied to said stepping motor in the reverse rotation of said stepping motor so that said control means determines an occurence of an abnormal operation when said positional sensor is in the first state in the reading.

2. A lens shutter driving mechanism using a lens driving mechanism according to claim 1, wherein an amount of movement of said main driving member necessary to logic inversion of said positional sensor between the first state and the second state is converted into a plurality of steps in terms of the number of pulses supplied to said stepping motor; and a time of pulses supplied to said stepping motor is relatively extended at the timing of reading the state of said positional sensor.

3. A lens shutter driving mechanism including:

a stepping motor for rotating in normal and reverse directions in accordance with a phase order of a sequentially supplied pulse train;

a main driving member coupled with said stepping motor to be driven in a forwarding direction and a return direction in accordance with the rotational direction of said stepping motor;

a blade driving member coupled with a shutter blade and disposed adjacent a moving line of said main driving member to open and close the shutter blade;

a blade driving member starting member formed in said main driving member so as to not operate said blade driving member in the forward movement of said main driving member from its initial position and to operate said blade driving member in the return movement of said main driving member to its initial position;

a lens driving member urged to move in the return direction of said main driving member and advanced to follow said main driving member after said blade driving member starting member formed in said main driving member has passed by said blade driving member in the forward movement of said main driving member to drive a focus adjusting lens group.

an engagement member for engaging said lens driving member so as to not prevent the forward movement of said lens driving member and to restrict the return movement of said lens driving member;

an engagement release portion formed in said main driving member to release the engagement of said lens driving member by said engagement member after said blade driving member starting member has operated said blade driving member in the return movement of said main driving member;

a positional sensor for identifying a first state in which said lens driving member is in its initial position and a second state in which said lens driving member is in a position advanced from the initial position; and control means for controlling a normal pulse and a reverse pulse supplied to said stepping motor to control the normal rotation and the reverse rotation of said stepping motor and for confirming the initial position of said lens driving member in accordance with an output of said positional sensor, wherein an offset amount with which said lens driving member follows said main driving member after advancement by at least two rounds in terms of a pulse train in the normal rotational direction supplied to said stepping motor by said main driving member from the initial position of said main driving member is set between the initial position of said main driving member and the initial position of said lens driving member, and said engagement release portion is formed in a position in which the engagement of said lens driving member by said engagement member is released after said blade driving member starting member has operated said blade driving member in the return movement of said main driving member and after said main driving member has returned from its initial position to within at least one round in terms of a pulse train of reverse pulses supplied to said stepping motor.

4. A lens shutter driving mechanism using a lens driving mechanism according to claim 3, wherein said focus adjusting lens group does not reach an effective focus adjusting area until said lens driving member advances from the initial position thereof by one round in terms of a pulse train in the normal rotation direction supplied to said stepping motor, and the relative position of said second positional sensor to said lens driving member is adjusted so that said second positional sensor is changed from the first state to the second state while said lens driving member advances from the initial position thereof by one round in terms of a pulse train in the normal rotation direction supplied to said stepping motor.

5. A lens shutter driving mechanism using a lens driving mechanism according to claim 3, wherein an amount of movement of said lens driving member necessary for logic inversion of said positional sensor between the first state and the second state is converted into a plurality of steps in terms of the number of pulses supplied to said stepping motor, and a time of pulses supplied to said stepping motor is relatively extended at the timing of reading the state of said positional sensor.

6. A lens shutter driving mechanism using a lens driving mechanism according to claim 4, wherein an amount of movement of said lens driving member necessary for logic inversion of said positional sensor between the first state and the second state is converted into a plurality of steps in terms of the number of pulses supplied to said stepping motor, and a time of pulse supplied to said stepping motor is relatively extended at the timing of reading the state of said positional sensor.

* * * * *